United States Patent [19]

Ogawa et al.

[11] Patent Number: 5,386,694
[45] Date of Patent: Feb. 7, 1995

[54] CONTROL SYSTEM FOR INTERNAL COMBUSTION ENGINES

[75] Inventors: Ken Ogawa; Yasunori Ehara; Kei Machida, all of Wako, Japan

[73] Assignee: Honda Giken Kogyo Kabushiki Kaisha, Tokyo, Japan

[21] Appl. No.: 110,776

[22] Filed: Aug. 23, 1993

[30] Foreign Application Priority Data

Aug. 24, 1992 [JP] Japan .................. 4-247371
Aug. 26, 1992 [JP] Japan .................. 4-250665

[51] Int. Cl.⁶ ............................. F01N 3/20
[52] U.S. Cl. ........................... 60/276; 60/285; 60/288
[58] Field of Search .......... 60/285, 287, 288, 295, 60/274, 276, 277

[56] References Cited

U.S. PATENT DOCUMENTS

| | | | |
|---|---|---|---|
| 4,345,431 | 8/1982 | Suzuki et al. | 60/295 |
| 4,462,208 | 7/1984 | Hicks | 60/286 |
| 4,485,621 | 12/1984 | Wong | 60/288 |
| 4,862,689 | 9/1989 | Duret | 60/288 |
| 5,140,811 | 8/1992 | Minami et al. | 60/288 |

FOREIGN PATENT DOCUMENTS

| | | | |
|---|---|---|---|
| 52-135713 | of 0000 | Japan . | |
| 0212318 | 12/1982 | Japan | 60/288 |
| 2-67443 | 3/1990 | Japan . | |

Primary Examiner—Ira S. Lazarus
Assistant Examiner—Daniel J. O'Connor
Attorney, Agent, or Firm—Nikaido, Marmelstein, Murray & Oram

[57] ABSTRACT

A control system for controlling operation of an internal combustion engine detects a selected one of two exhaust modes: a first exhaust mode in which exhaust gases are guided through a first catalytic converter upstream of a second catalytic converter, and a second exhaust mode in which exhaust gases are guided through a bypass passage bypassing the first catalytic converter. A control mode is determined according to the selected one of the two exhaust modes, in which the operation of the engine is to be controlled by the control system.

7 Claims, 14 Drawing Sheets

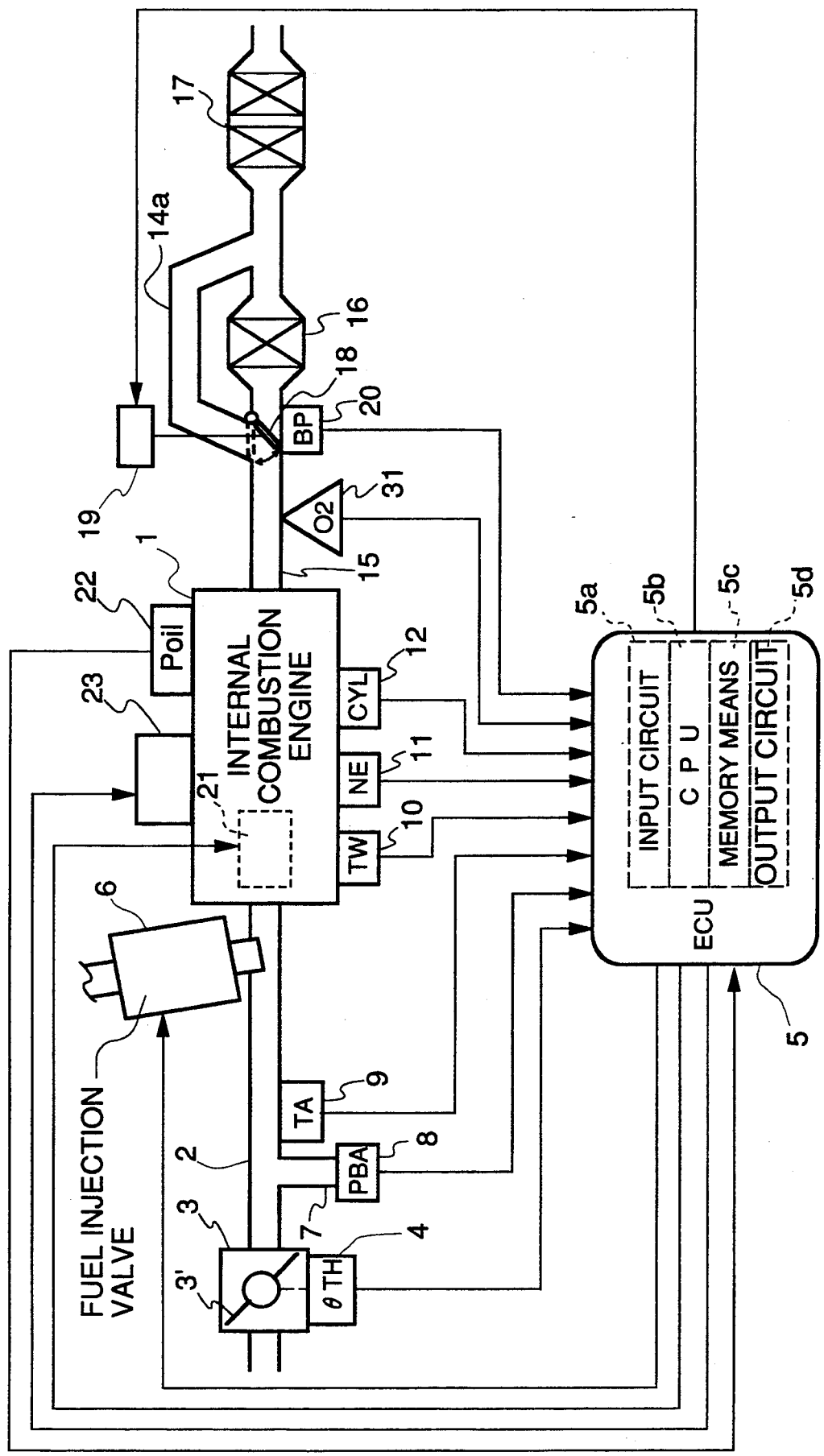

FIG.3A

Ti MAP

|  | PBA1 | ....... | PBAm | ....... | PBA17 |
|---|---|---|---|---|---|
| NE1 | TiM(1,1) | ....... | TiM(1,m) | ....... | TiM(1,17) |
| ⋮ | ⋮ | ⋱ | ⋮ | ⋱ | ⋮ |
| NEn | TiM(n,1) | ....... | TiM(n,m) | ....... | TiM(n,17) |
| ⋮ | ⋮ | ⋱ | ⋮ | ⋱ | ⋮ |
| NE20 | TiM(20,1) | ....... | TiM(20,m) | ....... | TiM(20,17) |

FIG.3B $\theta$ IG MAP

|  | PBA1 | ....... | PBAm | ....... | PBA17 |
|---|---|---|---|---|---|
| NE1 | $\theta$IGM(1,1) | ....... | $\theta$IGM(1,m) | ....... | $\theta$IGM(1,17) |
| ⋮ | ⋮ | ⋱ | ⋮ | ⋱ | ⋮ |
| NEn | $\theta$IGM(n,1) | ....... | $\theta$IGM(n,m) | ....... | $\theta$IGM(n,17) |
| ⋮ | ⋮ | ⋱ | ⋮ | ⋱ | ⋮ |
| NE20 | $\theta$IGM(20,1) | ....... | $\theta$IGM(20,m) | ....... | $\theta$IGM(20,17) |

CONTROL SYSTEM FOR INTERNAL COMBUSTION ENGINES

BACKGROUND OF THE INVENTION

1. Field of the Invention

This invention relates to a control system for controlling the operation of an internal combustion engine, and more particularly to a control system which is adapted to change a control mode depending on an exhaust mode which determines a path through which exhaust gases are exhausted.

2. Prior Art

A control system for controlling the operation of an internal combustion engine is conventionally Known, which has two (first and second) catalytic converters arranged in series in an exhaust passage of an internal combustion engine. The first catalytic converter has a capacity smaller than that of the second converter and is arranged at a location relatively close to the engine, whereby it is possible to effect efficient purification of exhaust gases emitted from the engine when it is started at a low temperature, through accelerated activation of the catalytic converter. However, according to the control system, the first catalytic converter arranged in the exhaust passage at a location relatively close to the engine is exposed to exhaust gases at a high temperature during engine operation after the engine has been warmed up, so that the first catalytic converter is deteriorated at a higher speed, resulting in a shortened service life thereof.

To overcome such an inconvenience, an exhaust gas purifying system has already been proposed in Japanese Provisional Utility Model Registration Publication (Kokai) No. 52-135713, which has a bypass passage bypassing the first catalytic converter, and a selector valve for changing over the flow path of exhaust gases between one passing through the first catalytic converter and one passing through the bypass passage.

According to this prior art, when the engine is started at a low temperature, exhaust gases can be purified efficiently by the first catalytic converter, and then the selector valve is operated to select the flow path of exhaust gases passing through the bypass passage after the engine has been warmed up, whereby the second catalytic converter alone is operative to purify the exhaust gases, to thereby make it possible to prolong the service life of the first catalytic converter.

However, when the selector valve is operated to select the flow path of exhaust gases passing through the first catalytic converter, the pressure of exhaust gases increases to lower the exhaust efficiency of the engine, so that the intake efficiency $\eta V$ is lowered, whereas when the selector valve is operated to select the flow path passing through the bypass passage, the pressure of the exhaust gases decreases to increase the exhaust efficiency, so that the intake efficiency $\eta V$ is enhanced. In spite of such a variation in the intake efficiency $\eta V$, the fuel supply and ignition timing are not changed correspondingly to changeover of the flow path of exhaust gases, which prevents the air-fuel ratio and the state of combustion from being stabilized, resulting in degraded exhaust emission characteristics.

On the other hand, an air-fuel ratio control system has been proposed e.g. by Japanese Provisional Patent Publication (Kokai) No. 2-67443, which comprises a linear output air-fuel ratio sensor (hereinafter referred to as "the LAF sensor") having an output characteristic which is substantially proportional to the concentration of oxygen present in exhaust gases, arranged in an exhaust passage of an engine at a location upstream of a catalytic converter, and an O2 sensor arranged in the exhaust passage at a location downstream of the catalytic converter, an output from the O2 sensor which drastically changes when the air-fuel ratio of a mixture supplied to the engine changes across the stoichiometric air-fuel ratio. According to the proposed system, the desired output voltage of the LAF sensor or desired air-fuel ratio coefficient is corrected based on the output from the O2 sensor, and the output from the LAF sensor is feedback-controlled to the corrected desired output voltage or an equivalent ratio of the output from the LAF sensor is feedback-controlled to the corrected desired air-fuel ratio coefficient, to control the air-fuel ratio to the stoichiometric air-fuel ratio.

If the aforementioned selector valve and the bypass passage are additionally provided in this proposed air-fuel ratio control system having two oxygen sensors (the LAF sensor and the O2 sensor), presumably it is possible to constantly control the air-fuel ratio to the stoichiometric air-fuel ratio irrespective of whether the engine has been warmed up or not, and hence to further improve exhaust emission characteristics.

However, in this combination, when the selector valve is operated to select the flow path of exhaust gases through the bypass passage, the oxygen storage effect of the first catalytic converter is not obtained, so that the output from the O2 sensor downstream of the first catalytic converter directly reflects the oxygen concentration of exhaust gases emitted from the combustion chambers of the engine so that the repetition period of inversion of the sensor output between the rich side and the lean side becomes short against its originally intended purpose. Therefore, if the desired air-fuel ratio coefficient is corrected based on the output from the O2 sensor downstream of the first catalytic converter to feedback-control the output from the LAF sensor to the corrected desired air-fuel ratio coefficient, when exhaust gases are guided through the bypass passage, the degree of convergence of the air-fuel ratio to the desired value is liable to be lower, leading to degraded exhaust emission characteristics.

SUMMARY OF THE INVENTION

It is the object of the invention to provide a control system for an internal combustion engine which is capable of always controlling the air-fuel ratio of a mixture supplied to the engine to a proper value, irrespective of whether exhaust gases are guided through a catalytic converter suitable for warming-up conditions of the engine, to thereby improve exhaust emission characteristics, etc.

To attain the object, the present invention provides a control system for controlling operation of an internal combustion engine including an exhaust passage, a first catalytic converter arranged in the exhaust passage, a second catalytic converter arranged in the exhaust passage at a location downstream of the first catalytic converter, a bypass passage bypassing the first catalytic converter, and exhaust mode-changeover means for performing changeover of an exhaust mode between a first exhaust mode in which exhaust gases are guided through the first catalytic converter and a second exhaust mode in which exhaust gases are guided through the bypass passage.

The control system according to the invention is characterized by comprising:

exhaust mode-detecting means for detecting which of the first and second exhaust modes is selected by the exhaust mode-changeover means; and control mode-changeover means responsive to an output from the exhaust mode-detecting means for determining a control mode in which the operation of the engine is to be controlled by the control system.

Preferably, the control system includes control amount-calculating means for calculating at least one of a control amount for control of an amount of fuel supplied to the engine and a control amount for control of ignition timing of the engine, and the control mode-changeover means is responsive to the output from the exhaust mode-detecting means for performing changeover of the at least one of the control amount for the amount of fuel supplied to the engine and the control amount for the ignition timing, between a value suitable for the first exhaust mode and a value suitable for the second exhaust mode.

More preferably, the control system includes operating condition-detecting means for detecting operating conditions of the engine including the rotational speed of the engine and load on the engine, and the control amount-calculating means includes basic control amount-calculating means for calculating at least one of a basic control amount for control of the amount of fuel supplied to the engine and a basic control amount for control of the ignition timing of the engine, the control mode-changeover means performing changeover of at least one of the basic control amounts between a first basic control amount suitable for the first exhaust mode and a second basic control amount suitable for the second exhaust mode.

Further preferably, the engine includes at least one cylinder, an intake valve provided for each of the at least one cylinder for controlling the supply of an air-fuel mixture to the each cylinder, an exhaust valve provided for the each cylinder for controlling the delivery of exhaust gases from the each cylinder, valve timing-changeover means for performing changeover of valve timing of at least one of the intake valve and the exhaust valve between a high speed valve timing suitable for operation of the engine in a high rotational speed region, and a low speed valve timing suitable for operation of the engine in a low rotational speed region, and valve timing-detecting means for detecting valve timing selected by the valve timing-changeover means, and the control mode-changeover means is responsive to an output from the valve timing-detecting means, for employing a control amount value suitable for the high speed valve timing or a control amount value suitable for the low speed valve timing, as the first basic control amount or the second basic control amount.

Still more preferably, the engine includes an intake passage, and at least one fuel injection valve for injecting fuel into the intake passage, the control amount-calculating means including direct supply amount-determining means for determining a direct supply amount of fuel directly supplied to the engine out of fuel injected by the at least one fuel injection valve, indirect supply amount-determining means for determining an indirect supply amount of fuel supplied to the engine out of fuel adhering to the intake passage, and correcting means for correcting a control amount for control of an amount of fuel supplied to the engine, based on at least one of the direct supply amount of fuel determined by the direct supply amount-determining means and the indirect supply amount of fuel determined by the indirect supply amount-determining means.

Further preferably, the control mode-changeover means is responsive to the output from the exhaust mode-detecting means, for performing changeover of each of the direct supply amount of fuel and the indirect supply amount of fuel between a value suitable for the first exhaust mode and a value suitable for the second exhaust mode.

Preferably, the control system includes first exhaust gas ingredient concentration sensor means arranged in the exhaust passage at a location upstream of the exhaust mode-changing means and having an output characteristic substantially proportional to the concentration of a specific ingredient in the exhaust gases, engine operating condition-detecting means for detecting operating conditions of the engine, desired air-fuel ratio control parameter-calculating means for calculating a control parameter of a desired air-fuel ratio of an air-fuel mixture supplied to the engine, based on results of detection by the engine operating condition-detecting means, second exhaust gas ingredient concentration sensor means arranged in the exhaust passage at a location downstream of the bypass passage and upstream of the second catalytic converter and having an output characteristic that an output therefrom drastically changes in the vicinity of a stoichiometric air-fuel ratio of the air-fuel mixture supplied to the engine, correcting means for correcting the control parameter of the desired air-fuel ratio based on the output from the second exhaust gas ingredient concentration sensor means, control means for feedback-controlling the air-fuel ratio of the mixture detected based on an output from the first exhaust gas ingredient concentration sensor means to the stoichiometric air-fuel ratio, based on the control parameter of the desired air-fuel ratio coefficient corrected by the correcting means, and inhibiting means responsive to the output from the exhaust mode-detecting means for inhibiting the correcting means from correcting the control parameter of the desired air-fuel ratio when the second exhaust mode is selected.

The above and other objects, features, and advantages of the invention will become more apparent from the ensuing detailed description taken in conjunction with the accompanying drawings.

BRIEF DESCRIPTION OF THE DRAWINGS

FIG. 1 is a block diagram showing the whole arrangement of a control system for an internal combustion engine according to a first embodiment of the invention;

FIG. 3A shows a Ti map for determining a basic fuel injection period TiM according to engine rotational speed NE and intake pipe absolute pressure PBA;

FIG. 3B shows a $\theta$ IG map for determining basic ignition timing $\theta$ IGM according to the engine rotational speed NE and the intake pipe absolute pressure PBA;

DETAILED DESCRIPTION

Figure 2A:
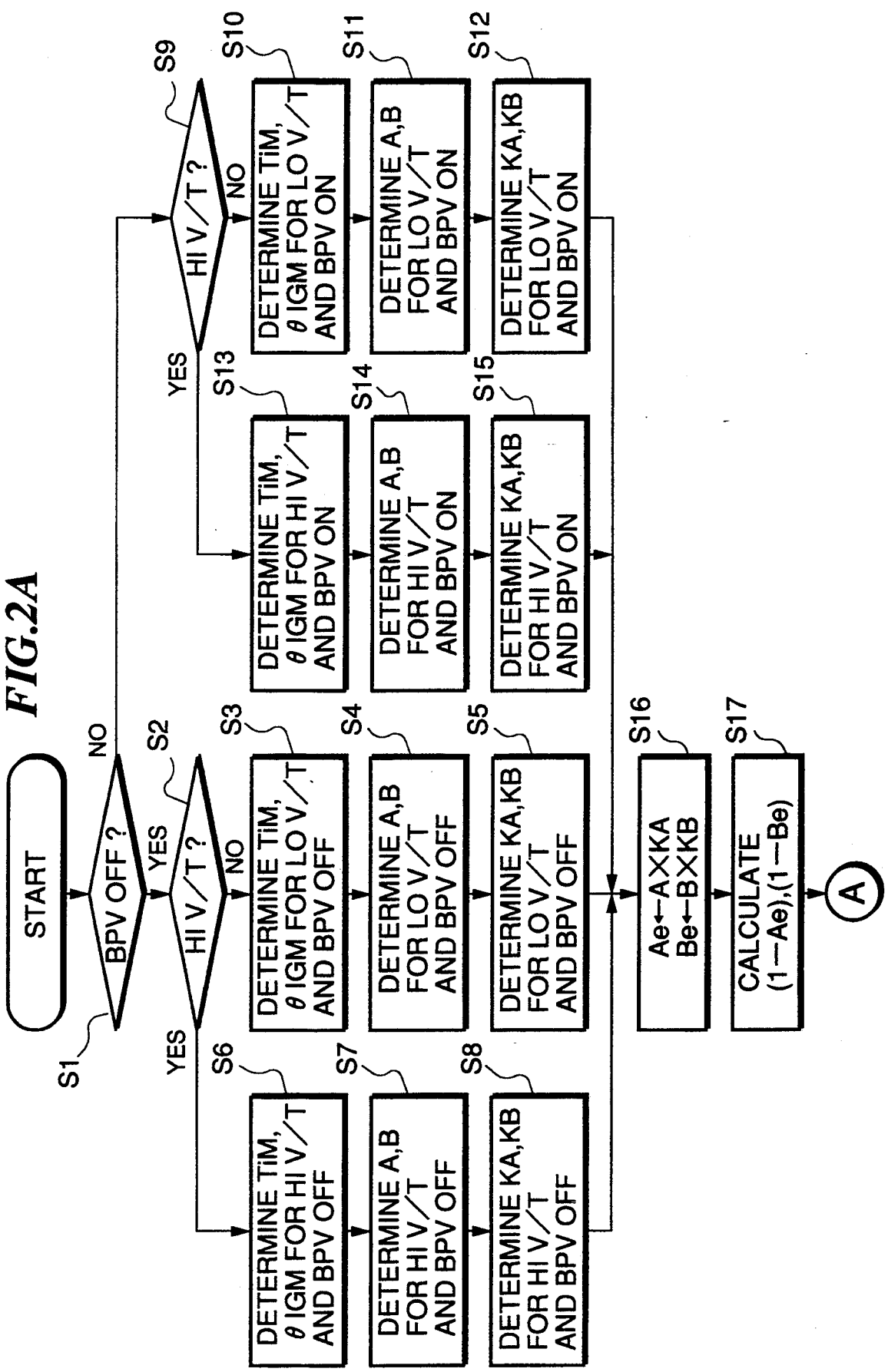
FIG. 2A is part of a flowchart of a program for determining a fuel injection period (TOUT) and injection timing ($\theta$ IG) according to the first embodiment.

The invention will now be described in detail with reference to the drawings showing embodiments thereof.

Referring first to FIG. 1, there is illustrated the whole arrangement of a control system for an internal combustion engine according to a first embodiment of the invention.

In the figure, reference numeral 1 designates a DOHC straight type four-cylinder engine (hereinafter simply referred to as "the engine"), each cylinder being provided with a pair of intake valves and a pair of exhaust valves, not shown. This engine is provided with a valve timing changeover device 21 which is capable of changing the operating characteristics of the intake valves and exhaust valves, for example, the valve opening period and the valve lift (generically referred to hereinafter as "the valve timing") between a high speed valve timing (hereinafter referred to as "the HI V/T") adapted to a high engine speed region and a low speed valve timing (hereinafter referred to as "the LO V/T") adapted to a low engine speed region.

More specifically, the valve timing changeover device 21 comprises an electromagnetic valve (not shown) for execution of changeover of the valve timing, which is connected to an electronic control unit (hereinafter referred to as "the ECU") 5 to have the opening and closing operations thereof controlled by the ECU 5. The electromagnetic valve selects either high or low hydraulic pressure applied to the valve timing changeover device 21 for actuation thereof. Responsive to this high or low hydraulic pressure, the valve timing changeover device 21 operates to change the valve timing to either the high speed valve timing or the low speed valve timing. The hydraulic pressure applied to the valve timing changeover device 21 is detected by a hydraulic pressure (oil pressure) (Poil) sensor 22 which supplies a signal indicative of the sensed hydraulic pressure to the ECU 5.

Connected to the cylinder block of the engine 1 is an intake pipe 2 across which is arranged a throttle body 3 accommodating a throttle valve 3' therein. A throttle valve opening ($\theta$ TH) sensor 4 is connected to the throttle valve 3' for generating an electric signal indicative of the sensed throttle valve opening and supplying same to the ECU 5.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

Further, an intake pipe absolute pressure (PBA) sensor 8 is provided in communication with the interior of the intake pipe 2 via a conduit 7 opening into the intake pipe 2 at a location downstream of the throttle valve 3' for supplying an electric signal indicative of the sensed absolute pressure within the intake pipe 2 to the ECU 5.

An intake air temperature (TA) sensor 9 is inserted into the intake pipe 2 at a location downstream of the conduit 7 for supplying an electric signal indicative of the sensed intake air temperature TA to the ECU 5.

An engine coolant temperature (TW) sensor 10 formed of a thermistor or the like is inserted into a coolant passage filled with a coolant and formed in the cylinder block, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown.

The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder the engine, both of the pulses being supplied to the ECU 5.

Each cylinder of the engine has a spark plug 23 electrically connected to the ECU 5 to have its ignition timing controlled by a signal therefrom.

An oxygen concentration sensor (hereinafter referred to as "the O2 sensor") 15 is arranged in an exhaust pipe 14 at a location close to the cylinder block of the engine. The O2 sensor 15 has a sensor element formed of a solid electrolytic material of zirconia (ZrO2) having a characteristic that an electromotive force thereof drastically or suddenly changes when the air-fuel ratio of the mixture changes across the stoichiometric value, so that an output from the O2 sensor 15 is inverted from a lean value-indicative level to a rich value-indicative level, or vice versa, when the air-fuel ratio of the mixture changes across the stoichiometric value. More specifically, the O2 sensor 15 generates and supplies a high level signal when the air-fuel ratio of the mixture is rich, and a low level signal when it is lean, to the ECU 5.

A first catalytic converter 16 and a second catalytic converter 17 are arranged in series in the exhaust pipe 14 at respective locations downstream of the O2 sensor 15.

The first catalytic converter 16, which has a smaller capacity than the second catalytic converter 17, is arranged relatively close to the cylinder block of the engine such that it promptly becomes activated after the engine is started at a low temperature thereof to thereby improve exhaust emission characteristics of the engine. The first and second catalytic converters 16, 17 purify noxious components in the exhaust gases, such as HC, CO, and NOx. Further, an exhaust communication passage (hereinafter referred to as "the bypass passage") 14a bypassing the first catalytic converter 16 branches off from the exhaust pipe 14 at a location downstream of the O2 sensor 15 and again joins to same at a location upstream of the second catalytic converter 17.

A selector valve (hereinafter referred to as "the BPV" (abbreviated for bypass valve) 18 is provided at a bifurcating point of the exhaust pipe from which the bypass passage 14a branches off, as selector means for selectively guiding the flow of exhaust gases through the first catalytic converter 16 or through the bypass passage 14a. The BPV 18 is connected to an electric actuator 19 (e.g. an electromagnetic valve, an electric motor, or the like).

The electric actuator 19 is connected to the ECU 5 to be driven by a signal therefrom. The electric actuator 19 drives the BPV 18 to selectively determine a flow path of exhaust gases between one through the first catalytic converter and one through the bypass passage 14a.

When the electric actuator 19 is deenergized, the BPV 18 is in its bypassing (BPV OFF) position to guide the exhaust gases into the bypass passage 14a, and when the electric actuator 19 is energized, the BPV 18 is in its direct flow (BPV ON) position to guide the exhaust gases to the first catalytic converter 16. The BPV OFF position of the BPV 18 is indicated by the solid line in FIG. 1, while the BPV ON position is indicated by the broken line in same.

A BPV position sensor (hereinafter referred to as "the BP sensor") 20 is provided at the bifurcating point of the exhaust pipe 14 for detecting the position of the BPV 18, i.e. whether the BPV 18 is in its BPV ON position or in its BPV OFF position, to supply a signal indicative of the sensed position of the BPV 18 to the ECU 5. Alternatively, the position of the BPV 18 may be detected by the signal supplied to the electric actuator 19 from the ECU 5, since the BPV 18 is driven by the electric actuator 19. In the present embodiment, the BP sensor 20 is provided for improving the controllability of the engine 1 by accurately detecting the position of the BPV 18 even when the operation of the BPV 18 or the electric actuator 19 is delayed due to deterioration thereof, etc.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as the "the CPU") 5b, memory means 5c formed of a ROM storing various operational programs which are executed by the CPU 5b, and various maps and tables, referred to hereinafter, and a RAM for storing results of calculations therefrom, etc., an output circuit 5d which outputs driving signals to the fuel injection valves 6, the electric actuator 19, the electromagnetic valve of the valve timing changeover device 21, and the spark plugs 23, respectively.

Figure 2B:
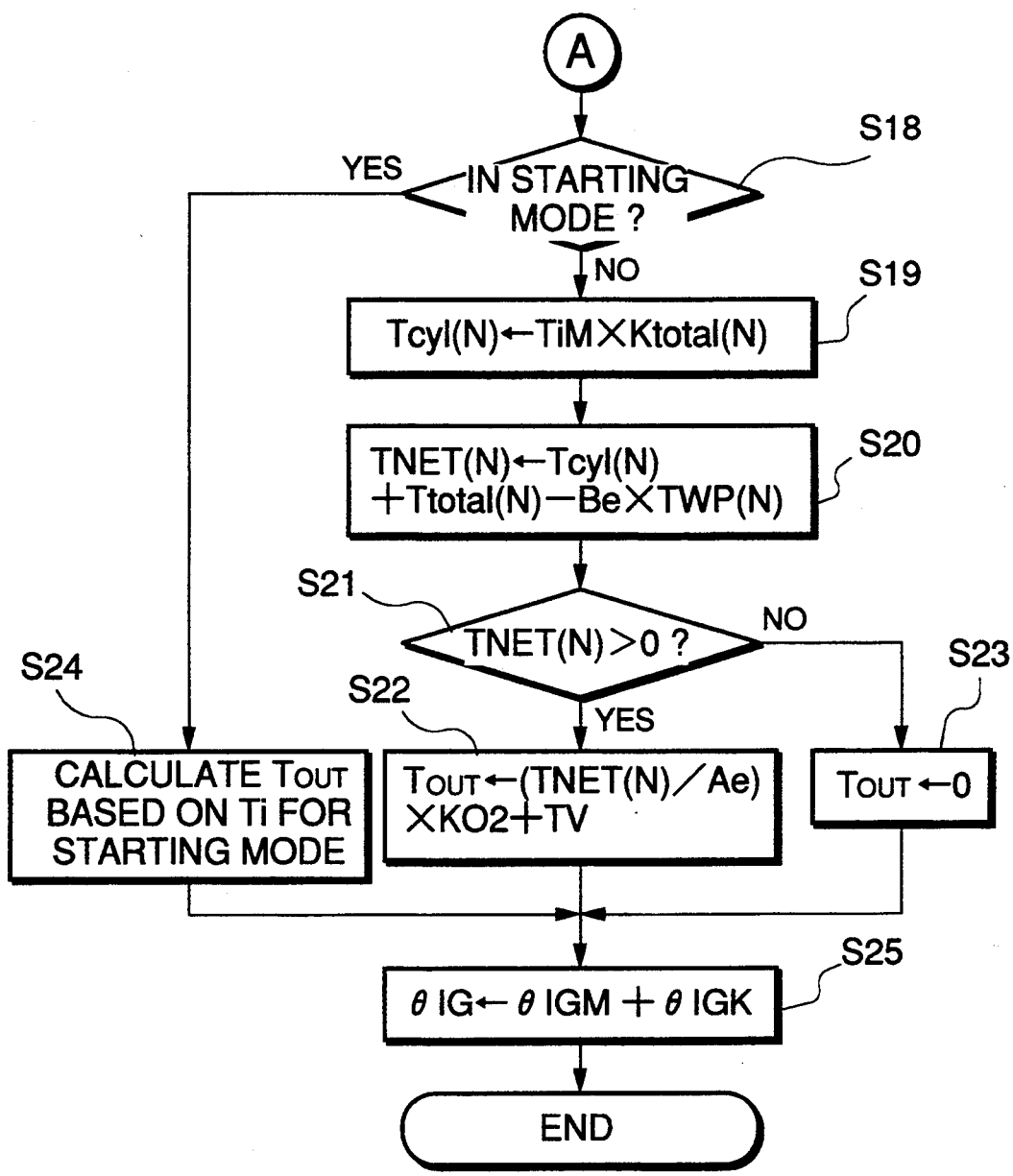
FIG. 2B is the remaining part of the flowchart of FIG. 2A.

FIG. 2A and FIG. 2B show a program for determining a fuel injection period (fuel supply amount) TOUT over which the fuel injection valve 6 is opened, and ignition timing $\theta$ IG of the spark plug 23 according to the first embodiment. This program is executed in synchronism with generation of each TDC signal pulse.

First, at a step S1, it is determined whether or not the BPV 18 is in is BPV OFF position. If the answer to this question is affirmative (YES), i.e. if the exhaust gases are guided through the bypass passage 14a, the program proceeds to a step S2, where it is determined whether or not the valve timing is selected to the HI V/T.

If the answer to the question of the step S2 is negative (NO), i.e. if the valve timing is selected to the LO V/T, the program proceeds to a step S3, where a basic fuel injection period TiM and basic ignition timing $\theta$ IGM suitable for engine operation with the LO V/T and the BPV OFF position are determined by retrieving a Ti map and a $\theta$ IG map for the LO V/T and the BPV OFF position.

The Ti map and the $\theta$ IG map for the LO V/T and the BPV OFF position are set e.g. as shown in FIG. 3A and FIG. 3B, respectively, such that predetermined values TiM (1,1) to TiM (20,17) of the basic fuel injection period TiM and predetermined values $\theta$ IGM (1,1) to $\theta$ IGM (20,17) of the basic ignition timing $\theta$ IGM are provided correspondingly to predetermined values NE1 to NE20 of the engine rotational speed NE and predetermined values PBA1 to PBA17 of the intake pipe absolute pressure PBA. The basic fuel injection period TiM and the basic ignition timing $\theta$ IGM are read from the Ti map and the $\theta$ IG map, or additionally calculated by interpolation, if required.

Next, at the following steps S4 and S5, adherent fuel-dependent correction is carried out, to take into account an amount of fuel adhering to the inner wall surface of the intake pipe 2 after injection, and an amount of fuel evaporated and carried off by intake air from the fuel adhering to the inner wall surface.

More specifically, first at the step S4, a direct supply ratio A and a carry-off supply ratio B suitable for the LO V/T and the BPV OFF positions are determined. The direct supply ratio A is a ratio of an amount of fuel injected from the fuel injection valve 6 and directly drawn into a combustion chamber, per a single injection to a total amount of fuel injected per the single injection, and the carry-off supply ratio B is a ratio of an amount of fuel evaporated and carried off by intake air from fuel adhering to the inner wall surface of the intake pipe 2 and drawn into the combustion chamber to an amount of the fuel adhering to the inner wall surface of the intake pipe 2. The direct supply ratio A and the carry-off supply ratio B are determined by retrieving an A map and a B map (neither of which is shown) for the LO V/T and the BPV OFF position according to the engine coolant temperature TW and the intake pipe absolute pressure PBA, respectively, and additionally by interpolation, if required.

Figure 4A:
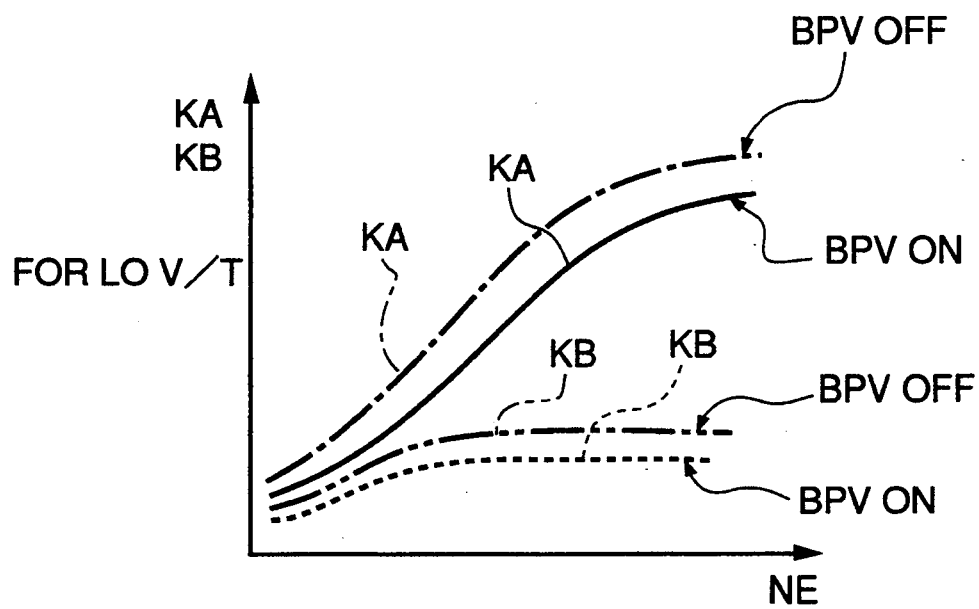
FIG. 4A shows a KA/KB table suitable for engine operation with low-speed valve timing (LO V/T) for determining correction coefficients for a direct supply ratio (A) and a carry-off supply ratio (B)

At the following step S5, a correction coefficient KA for the direct supply ratio A and a correction coefficient KB for the carry-off supply ratio B suitable for the LO V/T and the BPV OFF position are determined, followed by the program proceeding to a step S16. The correction coefficients KA and KB are determined by the use of a KA table and a KB table for the LO V/T and the BPV OFF position, collectively shown in FIG. 4A, according to the engine rotational speed NE. That is, the correction coefficient KA for the direct supply ratio A and the correction coefficient KB for the carry-off supply ratio B are set such that they are increased as the engine rotational speed NE increases.

The reason for setting the correction coefficients KA and KB to larger values with increase in the engine rotational speed NE is that the direct supply ratio A and the carry-off supply ratio B, actually, increase as the velocity of flow of intake air increases with an increase in the engine rotational speed NE.

On the other hand, if the answer to the question of the step S2 is affirmative (YES), similarly to the steps S3 to S5, the fuel injection period TiM and the basic ignition timing $\theta$ IGM, the direct supply ratio A and the carry-off supply ratio B, and the correction coefficients KA, KB, suitable for the HI V/T and the BPV OFF position, are calculated at steps S6 to S8, and then the program proceeds to the step S16.

Figure 4B:
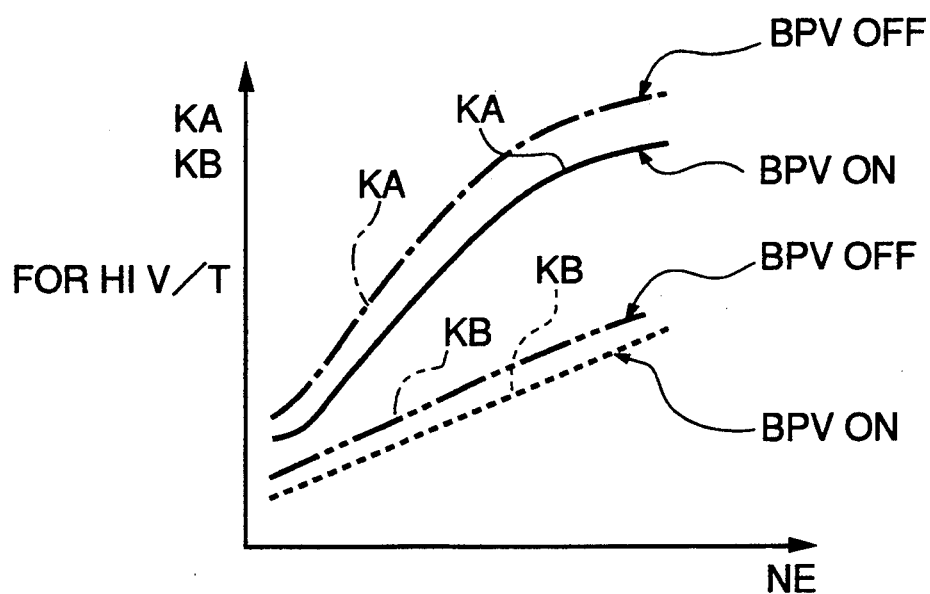
FIG. 4B Shows a KA/KB table suitable for engine operation with high-speed valve timing (HI V/T) for determining correction coefficients for the direct supply ratio (A) and the carry-off supply ratio (B)

More specifically, at the step S6, the basic fuel injection period TiM and basic ignition timing $\theta$ IGM suitable for the HI. V/T and the BPV OFF position are determined by retrieving a Ti map and a $\theta$ IG map for the HI V/T and the BPV OFF position, neither of which is shown but which are similar to those shown in FIG. 3A and FIG. 3B. Then, at the step S7, the direct supply ratio A and the carry-off supply ratio B are determined by retrieving an A map and a B map for the HI V/T and the BPV OFF position, neither of which is shown. Further, at the step S8, the correction coefficient KA for the direct supply ratio A and the correction ratio KB for the carry-off supply ratio B are determined by retrieving a KA table and a KB table for the HI V/T and the BPV OFF position, collectively shown in FIG. 4B.

On the other hand, if the answer to the question of the step S1 is negative (NO), i.e. if the BPV 18 is in its BPV ON position for guiding the exhaust gases through the first catalytic converter 16, the program proceeds to a step S9, where it is determined whether or not the valve timing is selected to the HI V/T.

If the answer to the question of the step S9 is negative (NO), i.e. if the valve timing is set to the LO V/T, the basic fuel injection period TiM and the basic ignition timing $\theta$ IGM, the direct supply ratio A and the carry-off supply ratio B, and the correction coefficients KA and KB suitable for the LO V/T and the BPV ON position are determined at steps S10 to S12, followed by the program proceeding to the step S16.

More specifically, at the step S10, the basic fuel injection period TiM and basic ignition timing $\theta$ IGM suitable for the LO V/T and the BPV ON position are determined by retrieving a Ti map and a $\theta$ IG map for the LO V/T and the BPV ON position, neither of which is shown but which are similar to those shown in FIG. 3A and FIG. 3B. Then, at the step S11, the direct supply ratio A and the carry-off supply ratio B are determined by retrieving an A map and a B map for the LO V/T and the BPV ON position, neither of which is shown. Further, at the step S12, the correction coefficient KA for the direct supply ratio A and the correction ratio KB for the carry-off supply ratio B are determined by retrieving a KA table and a KB table for the LO V/T and the BPV ON position, collectively shown in FIG. 4A.

If the answer to the question of the step S9 is affirmative (YES), i.e. if the valve timing is the HI V/T, similarly to the steps S10 to S12, the basic fuel injection period TiM and the basic ignition timing $\theta$ IGM, the direct supply ratio A and the carry-off supply ratio B, and the correction coefficients KA and KB suitable for the HI V/T and the BPV ON position, are determined at steps S13 to S15, followed by the program proceeding to the step S16.

More specifically, at the step S13, the basic fuel injection period TiM and basic ignition timing $\theta$ IGM suitable for the HI V/T and the BPV ON position are determined by retrieving a Ti map and a $\theta$ IG map for the HI V/T and the BPV ON position, neither of which is shown but which are similar to those shown in FIG. 3A and FIG. 3B. Then, at the step S14, the direct supply ratio A and the carry-off supply ratio B are determined by retrieving an A map and a B map for the HI V/T and the BPV ON position, neither of which is shown. Further, at the step S15, the correction coefficient KA for the direct supply ratio A and the correction ratio KB for the carry-off supply ratio B are determined by retrieving a KA table and a KB table for the HI V/T and the BPV ON position, collectively shown in FIG. 4B.

In this connection, the basic fuel injection period TiM, the basic ignition timing $\theta$ IGM, the direct supply ratio A and the carry-off supply ratio B should have suitable values varying depending on the position of the BPV 18 and the valve timing, and hence the above-mentioned Ti maps, the $\theta$ IG maps, the A maps, the B maps, the KA tables, and the KB tables are set so as to provide such variations for these values.

In other words, the provision of the Ti map, the $\theta$ IG map, the A map, the B map, the KA table, and the KB table each in four different types according to the HI V/T or LO V/T and the BPV OFF or BPV ON position is intended to cope with a change in the intake efficiency $\eta V$ caused by changeover of the flow path of exhaust gases, and variation in the velocity of flow of intake air in the vicinity of intake valves as one of the dominant factors of a fuel-carrying parameter, caused by changeover of the valve timing, as well as variation in the intake pressure resulting therefrom.

At the following step S16, a corrected direct supply ratio Ae and a corrected carry-off supply ratio Be are calculated by the use of the following equations (1) and (2):

$$Ae = A \times KA \qquad (1)$$

$$Be = B \times KB \qquad (2)$$

Further, (1−Ae) and (1−Be) are calculated at a step S17, followed by the program proceeding to a step S18 (FIG. 2B).

At the step S18, it is determined whether or not the engine is in a starting mode. If the answer to this question is affirmative (YES), the fuel injection period TOUT is calculated at a step S24 based on a value of the basic fuel injection period Ti suitable for the starting mode, and then the program proceeds to a step S25.

If the answer to the question of the step S18 is negative (NO), i.e. if the engine is not in the starting mode, a required fuel amount Tcyl (N) for each cylinder exclusive of an addend correction term Ttotal, referred to hereinafter, is calculated at a step S19 by the use of the following equation (3):

$$Tcyl(N) = TiM \times Ktotal(N) \qquad (3)$$

where (N) represents a number alloted to the cylinder for which the required amount Tcyl is calculated. A parameter carrying this symbol is determined for each of the cylinders. TiM represents the basic fuel injection period determined at the step S3, S6, S10, or S13. Ktotal(N) represents the total product of all the correction coefficients (e.g. an engine coolant temperature-dependent correction coefficient KTW, a leaning correction coefficient KLS, etc.) determined based on engine operating condition parameters detected by various sensors. An air-fuel ratio correction coefficient KO2 which is calculated in response to an output from the O2 sensor 15, however, is not included therein.

At the following step S20, a direct fuel supply amount TNET, which is an amount of fuel to be directly supplied to a combustion chamber of a cylinder corresponding to the present loop by injection effected in the present loop, is calculated by the use of the following equation (4):

$$TNET = Tcyl(N) + Ttotal - Be \times TWP(N) \qquad (4)$$

where Ttotal represents the sum of all the addend correction terms (e.g. an accelerating incremental term TACC, etc.) determined based on engine operating condition parameters detected by various sensors. An ineffective time period-dependent correction term TV, referred to hereinafter, however, is not included therein. TWP(N) represents an amount (estimated amount) of fuel adhering to the inner wall surface of the intake pipe, which is determined by executing a program, described hereinafter with reference to FIG. 5, and Be×TWP(N) corresponds to an amount of fuel carried off into the combustion chamber from the fuel adhering to the inner wall surface of the intake pipe 2. An amount of fuel corresponding to the amount of fuel carried off from the adherent fuel into the combustion chamber need not be injected, and hence Be×TWP(N) is subtracted from the Tcyl(N) value in the equation (4).

At a step S21, it is determined whether or not the direct fuel supply amount TNET is larger than 0. If the answer to this question is negative (NO), i.e., if TNET≦0, the fuel injection period TOUT is set to 0 at a step S23, and then the program proceeds to the step S25. On the other hand, if the answer to the question of the step S21 is affirmative (YES), i.e. if TNET>0, the fuel injection period TOUT is calculated by the use of the following equation (5):

$$TOUT = (TNET(N)/Ae) \times KO2 + TV \qquad (5)$$

where KO2 represents the air-fuel ratio correction coefficient determined based on the output from the O2 sensor 15 and TV the ineffective time period-dependent correction term.

By opening the fuel injection valve 6 over the fuel injection period TOUT calculated by the use of the equation (5), an amount of fuel corresponding to (TNET(N)×KO2+Be×TWP(N)) is supplied to the combustion chamber.

At the step S25, the ignition timing θ IG is calculated by the use of the following equation (6):

$$\theta IG = \theta IGM + \theta IGK \qquad (6)$$

where θ IGM represents the basic ignition timing determined at the step S3, S6, S10 or S13, and θ IGK represents a correction term determined based on engine operating condition parameters, such as the engine coolant temperature TW, the intake air temperature TA, the operating mode of the engine, the accelerating or decelerating state of the engine, and an exhaust gas recirculation ratio by an exhaust gas recirculation system, followed by terminating the program.

The ignition timing of the spark plug 23 of each cylinder is controlled based on a value of the ignition timing θ IG obtained by the equation (6).

As described above, according to the present embodiment, the fuel injection period TOUT and the ignition timing θ IG can be properly determined by execution of the program of FIG. 2A and FIG. 2B in a manner responsive to the selected flow path of exhaust gases and the selected valve timing, whereby the air-fuel ratio can be stabilized to a proper value, leading to improved exhaust emission characteristics.

Further, in the present embodiment, the direct supply ratio A and the carry-off supply ratio B are calculated and corrected in a manner responsive to the selected flow path of exhaust gases and the selected valve timing, which makes it possible to accurately estimate the influence of fuel adhering to the inner wall surface of the intake pipe on the air-fuel ratio of a mixture supplied to the engine, and hence to control the air-fuel ratio to a desired value.

Figure 5:
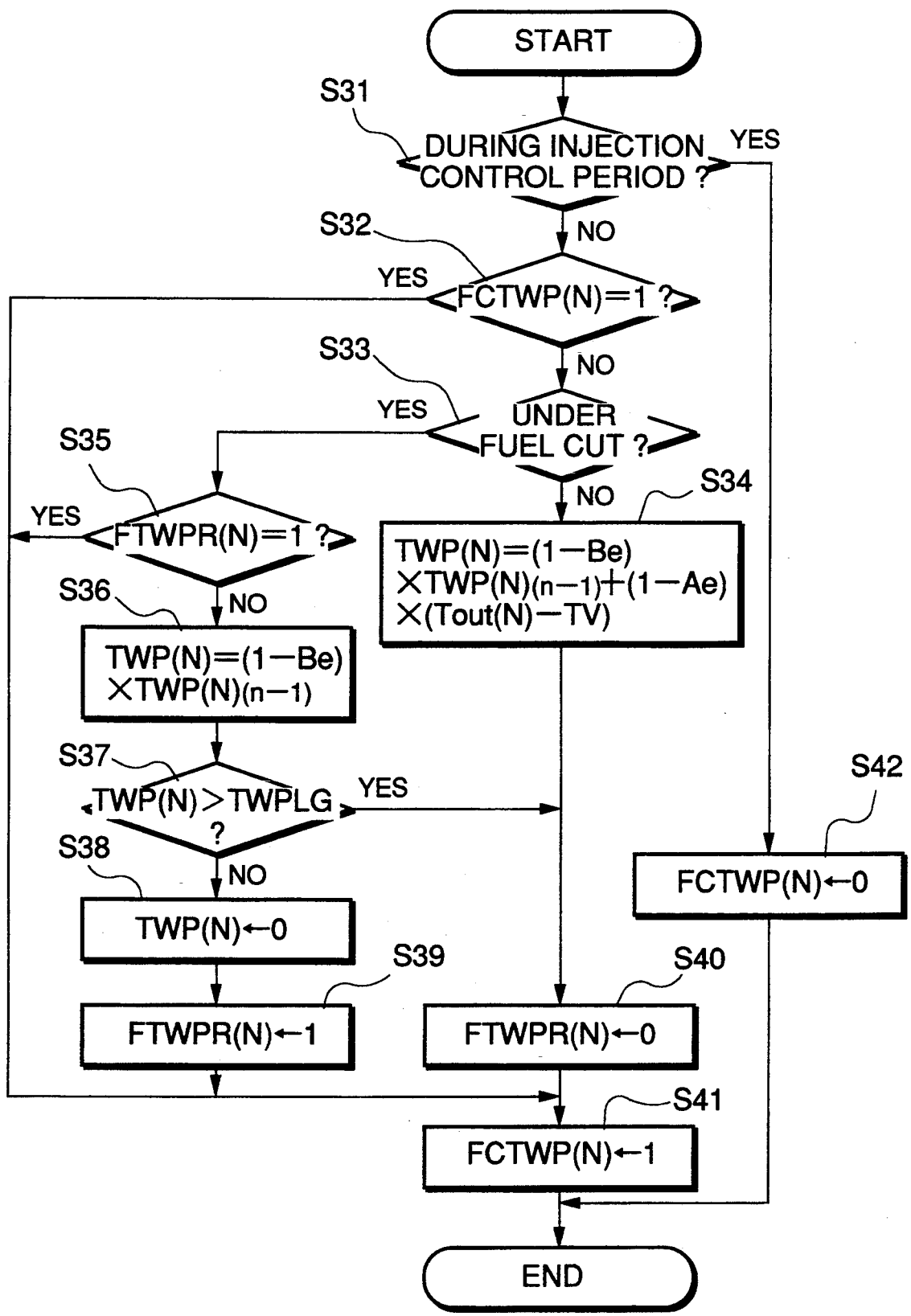
FIG. 5 is a flowchart of a program for determining an amount (TWP(N))of fuel adhering to an inner wall surface of an intake pipe.

FIG. 5 shows a program for calculating the aforementioned amount TWP(N) of fuel adhering to the inner wall surface of the intake pipe, which is executed in synchronism with generation of each crank angle signal pulse generated by a crank angle sensor, not shown, whenever the crankshaft rotates through a predetermined angle (e.g. 30 degrees).

First, at a step S31, it is determined whether or not the present loop is being executed during a time period (hereinafter referred to as "the injection control period") after the start of calculation of the fuel injection period TOUT and before the completion of fuel injection. If the answer to this question is affirmative (YES), a first flag FCTWP(N) is set to a value of 0 at a step S42, followed by terminating the program. If the answer to the question of the step S31 is negative (NO), it is determined at a step S32 whether or not the first flag FCTWP(N) is equal to 1. If the answer to this question is affirmative (YES), i.e. if FCTWP(N)=1, the program jumps over to a step S41, whereas if the answer is negative (NO), i.e. if FCTWP(N)=0, it is determined at a step S33 whether or not fuel cut (interruption of fuel supply to the engine) is being carried out.

If the answer to the question of the step S33 is negative (NO), i.e. if fuel cut is not being carried out, the amount TWP(N) of fuel adhering to the inner wall surface of the intake pipe is calculated at a step S34 by the use of the following equation (7):

$$TWP(N) = (1-Be) \times TWP(N) \times TWP(N)(n-1) + (1-Ae) \times (TOUT(N) - TV) \qquad (7)$$

where TWP(N)(n−1) represents an immediately preceding value of the amount TWP(N), and TOUT(N) a value of the fuel injection amount which has just been updated by the FIG. 2A–2B program. The first term on the right side represents an amount of fuel which is to remain on the inner wall surface without being carried off even after the present injection (the injection which is just about to be effected), and the second term on the right side represents an amount of fuel to newly adhere to the inner wall surface of the intake pipe, out of fuel injected by the present injection.

Then, the program proceeds to a step S40, where a second flag FTWPR(N) is set to a value of 0, and then at a step S41, the first flag TCTWP(N) is set to a value of 1, followed by terminating the program.

If the answer to the question of the step S33 is affirmative (YES), i.e. if fuel cut is being effected, the program proceeds to a step S35, where it is determined whether or not the second flag FTWPR(N) is equal to 1. If the answer to this question is affirmative (YES), i.e. if FTWPR(N)=1, the program jumps over to the step S41, whereas if the answer is negative (NO), i.e. if FTWPR(N)=0, the program proceeds to a step S36, where the amount TWP(N) is calculated by the following equation (8):

$$TWP(N) = (1 - Be) \times TWP(N)(n-1) \qquad (8)$$

The equation (8) differs from the equation (7) only in that the second term on the right side is omitted, since there is no fuel newly adhering to the intake pipe inner surface due to fuel cut.

Then, at a step S37, it is determined whether or not the amount TWP(N) is larger than a very small predetermined TWPLG. If the answer to this question is affirmative (YES), i.e. if TWP(N)>TWPLG, the program proceeds to the step S40, whereas if the answer is negative (NO), i.e. if TWP(N)≦TWPLG, the amount TWP(N) is set to a value of 0 at a step S38, and then the program proceeds to a step S39, where the second flag FTWPR(N) is set to 1, followed by the program proceeding to the step S41.

As described above, by executing the FIG. 5 program, it is possible to accurately calculate the amount TWP(N) of fuel adhering to the inner wall surface of the intake pipe, which is then used in calculation of the fuel injection period TOUT by the FIG. 2A–2B program, whereby it is possible to supply fuel to the combustion chamber of each cylinder in an appropriate amount which reflects an amount of injected fuel to adhere to the inner wall surface of the intake pipe and an amount of fuel to be carried off the adherent fuel into the combustion chamber.

Figure 6A:
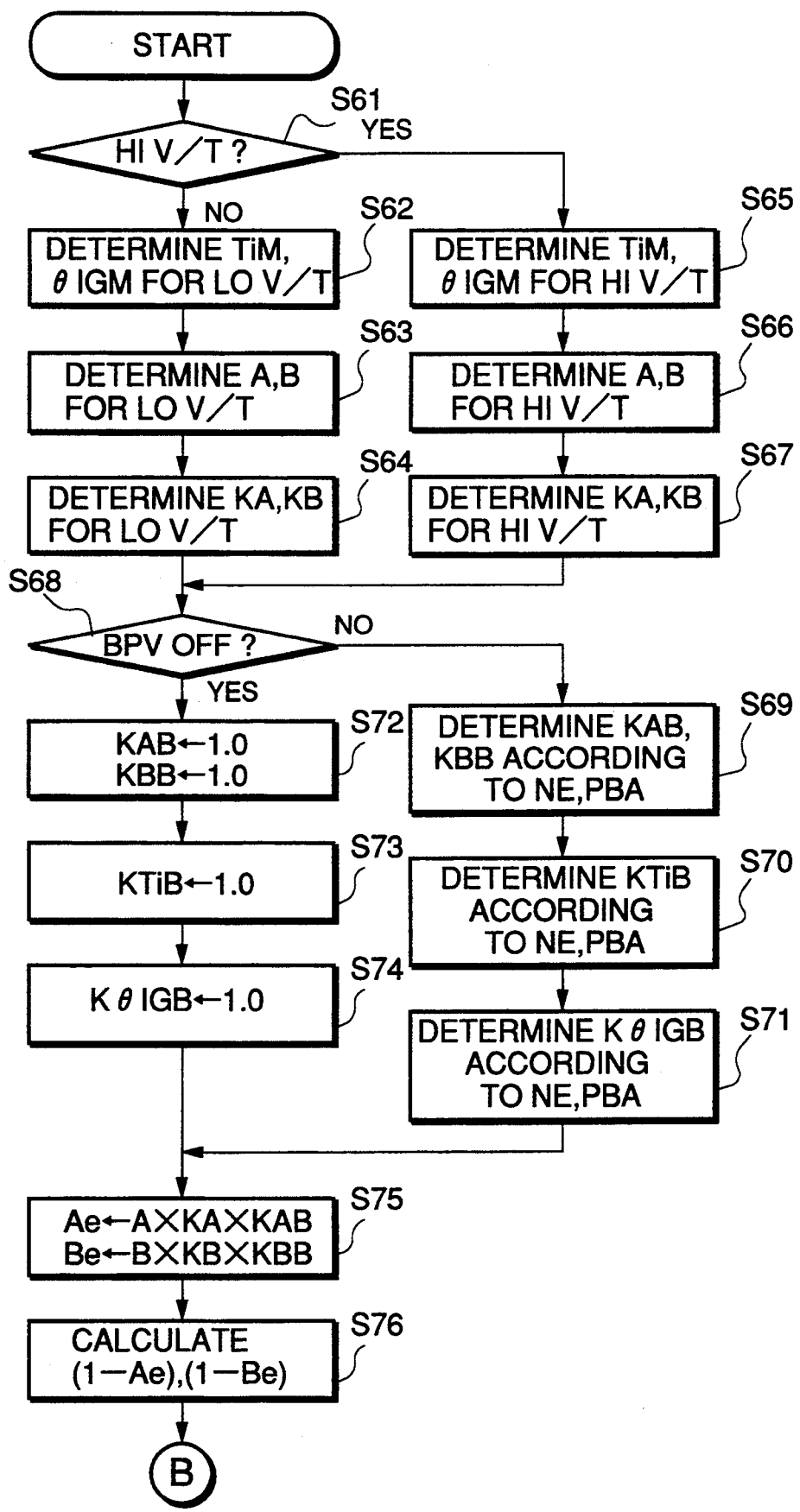
FIG. 6A is part of a flowchart of a program for determining a fuel injection period (TOUT) and injection timing ($\theta$ IG) according to a variation of the first embodiment.
Figure 6B:
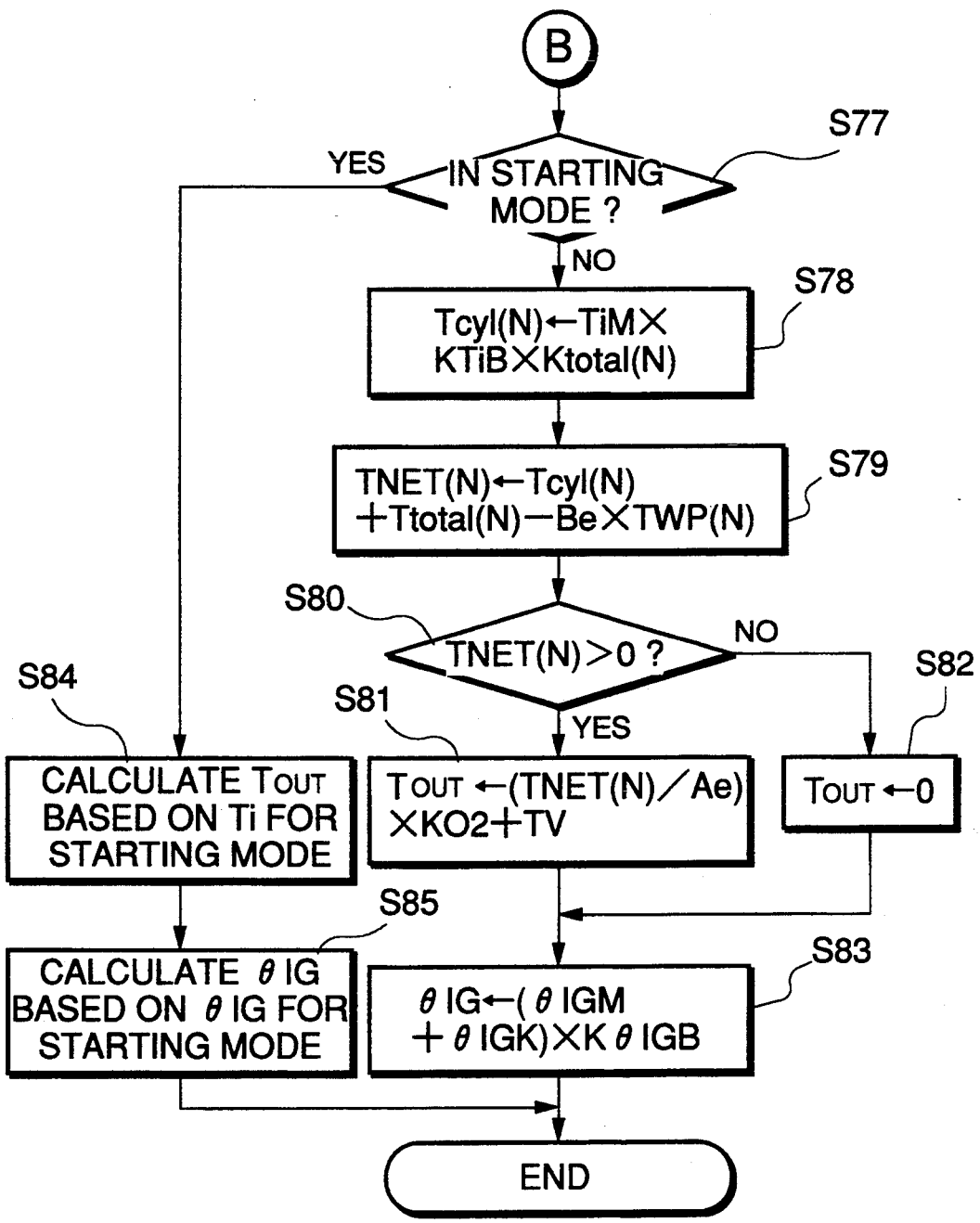
FIG. 6B is the remaining part of the flowchart of FIG. 6A.

FIG. 6A and FIG. 6B show a program for calculating the fuel injection period TOUT and the ignition timing $\theta$ IG according to a variation of the first embodiment, which is executed in synchronism with generation of each TDC signal pulse.

First, at a step S61, it is determined whether or not the valve timing is selected to the HI V/T. If the answer to this question is negative (NO), i.e. if the valve timing is selected to the LO V/T, the program proceeds to a step S62, where the basic fuel injection period TiM and the basic ignition timing $\theta$ IGM suitable for engine operation with the LO V/T are determined.

The basic fuel injection period TiM and the basic ignition timing $\theta$ IGM are determined by retrieving by a Ti map and an $\theta$ IG map for the LO V/T, neither of which is shown, according to the engine rotational speed NE and the intake pipe absolute pressure PBA, and additionally by interpolation, if required.

Then, at a step S63, the direct supply ratio A and the carry-off supply ratio B suitable for engine operation with the LO V/T are determined. The direct supply ratio A and the carry-off supply ratio B are determined by retrieving an A map and a B map for the LO V/T, neither of which is shown, according to the engine coolant temperature TW and the intake pipe absolute pressure PBA, and additionally by interpolation, if required.

Figure 7A:
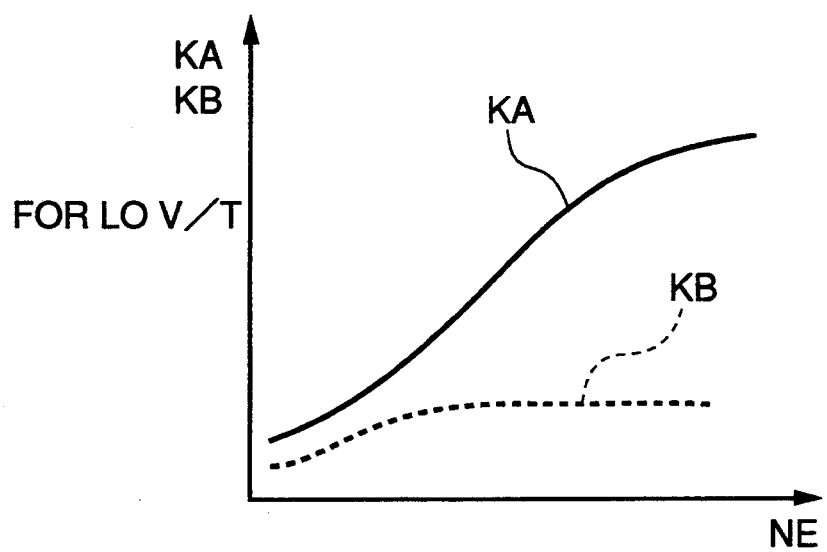
FIG. 7A shows a KA/KB table suitable for engine operation with low-speed valve timing (LO V/T) for determining correction coefficients for the direct supply ratio (A) and the carry-off supply ratio (B) according to the variation.

At the following step S64, the correction coefficients KA and KB suitable for the LO V/T are determined for the direct supply ratio A and the carry-off supply ratio B, respectively, and then the program proceeds to a step S68. The correction coefficients KA and KB are determined by retrieving a KA table and a KB table collectively shown in FIG. 7A according to the engine rotational speed NE.

Figure 7B:
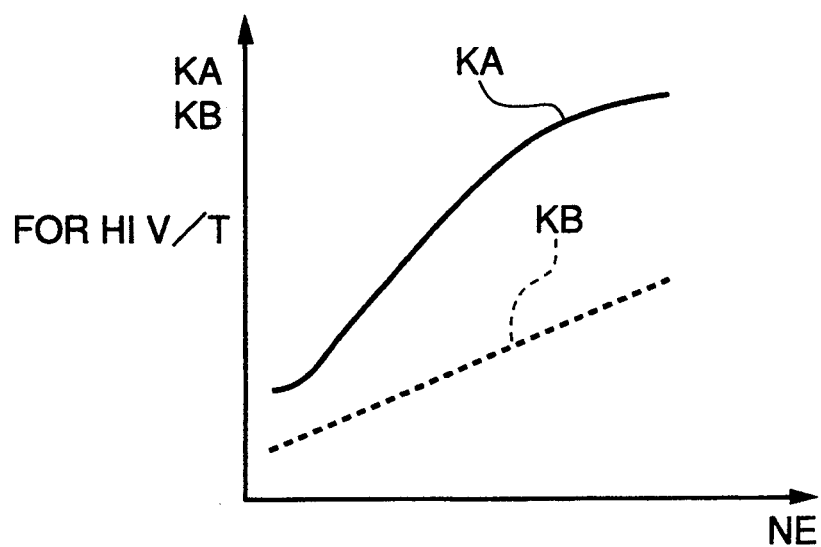
FIG. 7B shows a KA/KB table suitable for engine operation with high-speed valve timing (HI V/T) for determining correction coefficients for the direct supply ratio (A) and the carry-off supply ratio (B) according to the variation.

If the answer to the question of the step S61 is affirmative (YES), similarly to the steps S62 to S64, the basic fuel injection period TiM, and the basic ignition timing $\theta$ IGM suitable for the HI V/T are determined at a step S65 by retrieving a Ti map and a $\theta$ IG map for the HI V/T, neither of which is shown, the direct supply ratio A and the carry-off supply ratio B suitable for the HI V/T are calculated at a step S66 by retrieving an A map and a B map for the HI V/T, neither of which is shown, and the correction coefficients KA and KB suitable for the HI V/T are determined by retrieving a KA table and a KB table for the HI V/T, collectively shown in FIG. 7B.

At the step S68, it is determined whether or not the BPV 18 is in its BPV OFF position. If the answer to this question is negative (NO), i.e. if exhaust gases are guided through the first catalytic converter 16, the program proceeds to a step S69, where a correction coefficient KAB for the direct supply ratio A and a correction coefficient KBB for the carry-off supply ratio, both for use in the BPV ON position, are determined.

The correction coefficient KAB for the direct supply ratio A and the correction coefficient KBB for the carry-off supply ratio B, both suitable for the BPV ON position, are determined by retrieving a KAB map and a KBB map for the BPV ON position, neither of which is shown, according to the engine rotational speed NE and the intake pipe absolute pressure PBA, and additionally by interpolation if required.

At the following step S70, a correction coefficient KTiB for the basic fuel injection period TiM suitable for the BPV ON position is determined.

The correction coefficient KTiB for the basic fuel injection period TiM suitable for the BPV ON position is determine by retrieving a KTiB map, not shown, according to the engine rotational speed NE and the intake pipe absolute pressure PBA, and additionally by interpolation, if required.

Then, at a step S71, a correction coefficient K $\theta$ IGB suitable for the ignition timing $\theta$ IG suitable for the BPV ON position is calculated, followed by the program proceeding to a step S75.

The correction coefficient K $\theta$ IGB for the ignition timing $\theta$ IG suitable for the BPV ON position is determined by retrieving a K $\theta$ IGB map for the BPV ON position, not shown, according to the engine rotational speed NE and the intake pipe absolute pressure PBA, and additionally by interpolation, if required.

On the other hand, if the answer to the question of the step S68 is affirmative (YES), the program proceeds to a step S72, where the correction coefficient KAB for the direct supply ratio A and the correction coefficient KBB for the carry-off supply ratio B are both set to a value of 1. Then, at steps S73 and S74, the correction coefficient KTiB for the basic fuel injection period TiM and the correction coefficient K $\theta$ IGB for the ignition timing $\theta$ IG are both set to a value of 1, and then the program proceeds to the step S75.

The reason for setting all the correction coefficients KAB, KBB, KTiB and K $\theta$ IGB to a value of 1 at the steps S72 to S74 is that when the BPV 18 is in its BPV OFF position, exhaust gases are guided through the bypass passage 14a, so that the intake efficiency $\eta$V is not lowered and hence it is not necessary to effect correction on the mentioned control parameters.

Then, at the step S75, the corrected direct supply ratio Ae and the corrected carry-off supply ratio Be are calculated by the use of the following respective equations (9) and (10):

$$Ae = A \times KA \times KAB \quad (9)$$

$$Be = B \times KB \times KBB \quad (10)$$

Then, at a step S76, a value of (1−Ae) and a value of (1−Be) are calculated, followed by the program proceeding to a step S77 (FIG. 6B).

At the step S77, it is determined whether or not the engine is in the starting mode. If the answer to this question is affirmative (YES), the fuel injection period TOUT is determined at a step S84 based on a value of the basic fuel injection period suitable for the starting mode and the ignition timing $\theta$ IG at a step S85 based on a value of the ignition timing $\theta$ IG suitable for the starting mode, followed by terminating the program.

On the other hand, if the answer to the question of the step S77 is negative (NO), the required fuel amount Tcyl(N) for each cylinder is calculated at a step S78 by the use of the following equation (11):

$$Tcyl(N) = TiM \times KTiB \times Ktotal(N) \quad (11)$$

where TiM represents the basic fuel injection period determined either at the step S62 or at the step S65, and KTiB represents the correction coefficient for the basic fuel injection period TiM determined either at the step S70 or at the step S73.

At the step S79, the direct fuel supply amount TNET(N) is calculated by the use of the equation (4) described hereinabove with respect to the first embodiment, and at a step S80, it is determined whether or not the direct fuel supply amount TNET(N) thus obtained is larger than 0.

If the answer to the question of the step S80 is negative (NO), i.e. if TNET(N)≦0, the fuel injection period TOUT is set to a value of 0 at a step S82, followed by the program proceeding to a step S83, whereas if the answer is affirmative (YES), i.e. if TNET(N)>0, the fuel injection period TOUT is calculated at a step S81 by the use of the equation (5) described hereinabove with respect to the first embodiment, followed by the program proceeding to a step S83.

At the step S83, the ignition timing $\theta$ IG is calculated by the use of the following equation (12):

$$\theta IG = (\theta IGM + \theta IGK) \times K \theta IGB \quad (12)$$

where $\theta$ IGM on the right side represents the basic ignition timing determined either at the step S62 or at the step S65, $\theta$ IGK represents correction variables determined based on engine operating parameters, such as the engine coolant temperature TW, the intake air temperature TA, the operating mode of the engine and the exhaust recirculation ratio of exhaust gases recirculated by the exhaust gas recirculation system, and K $\theta$ IGB represents the correction coefficient determined either at the step S71 or at the step S74.

The ignition timing $\theta$ IG of the spark plug 23 is controlled for each cylinder based on a value thereof thus calculated by the use of the equation (12).

As described above, according to the variation of the first embodiment, by execution of the 6A-6B program, similarly to the first embodiment, depending on the flow path of exhaust gases selected by the BPV 18 and the selected valve timing, the fuel injection period TOUT and the ignition timing $\theta$ IG can be properly determined, whereby it is possible to stabilize the air-fuel ratio, leading to improved exhaust emission characteristics.

Next, a second embodiment of the invention will be described with reference to FIG. 8 to FIG. 12.

Figure 8:
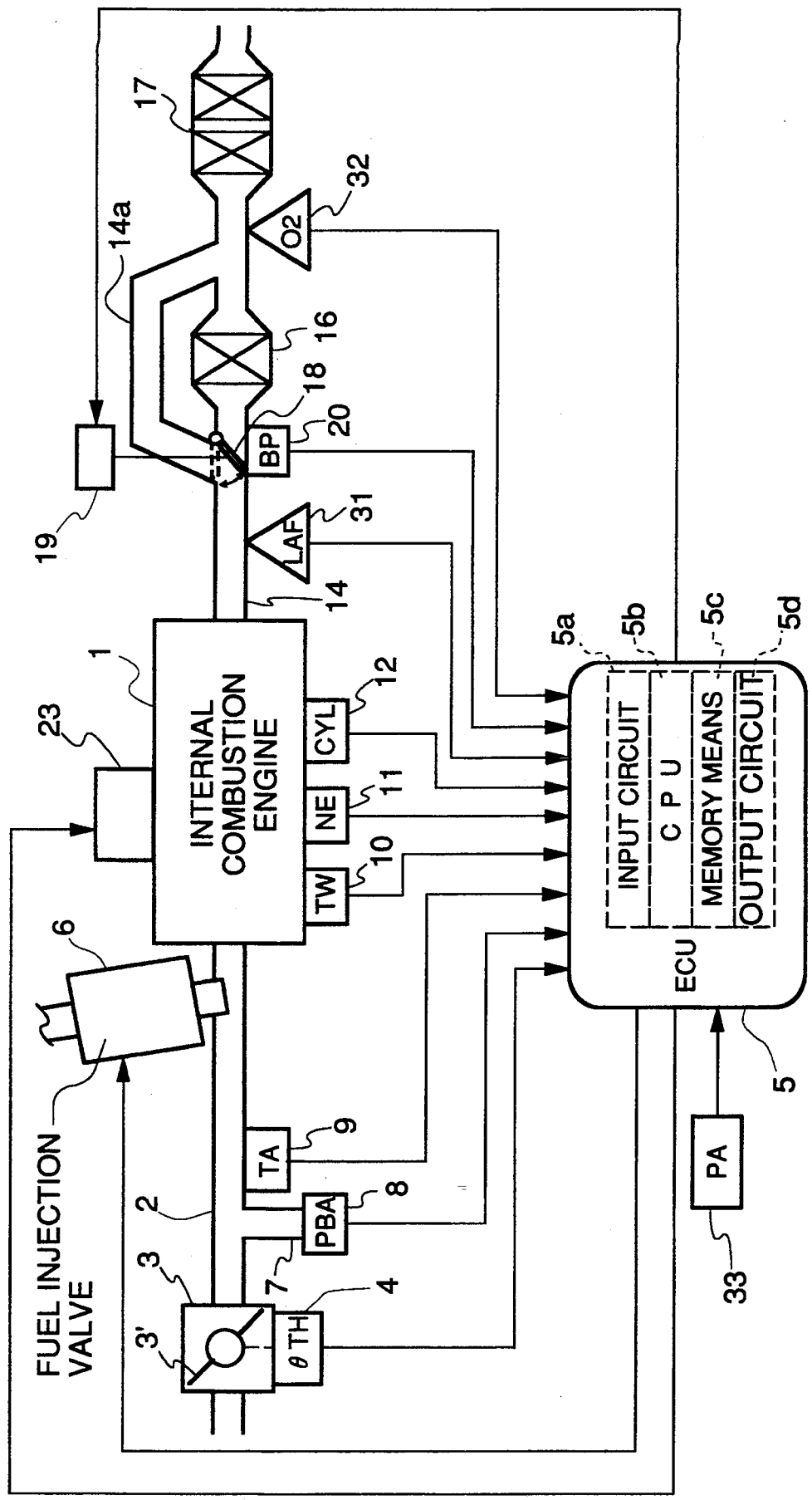
FIG. 8 is a block diagram showing the whole arrangement of a control system for an internal combustion engine according to a second embodiment of the invention.

FIG. 8 shows the whole arrangement of a control system (in the present embodiment, an air-fuel ratio control system) according to the second embodiment. In the figure, component parts or elements corresponding to those in FIG. 1 are designated by identical reference numerals. The second embodiment is distinguished in construction from the first embodiment in that a LAF sensor 31 and an O2 sensor 32 are arranged in the exhaust pipe 14 at a location upstream of the bifurcating point of the exhaust pipe 14 from which the bypass passage 14a branches off and at a location downstream of the joining point where the bypass passage 14a joins to the exhaust pipe 14 and at the same time upstream of the second catalytic converter 17, respectively.

The LAF sensor 31 comprises a sensor element formed of a solid electrolytic material of zirconia ($ZrO_2$) and having two pairs of cell elements and oxygen pumping elements mounted at respective upper and lower locations thereof, and an amplifier circuit electrically connected thereto. The LAF sensor 31 generates and supplies an electric output signal, the level of which is substantially proportional to the oxygen concentration in exhaust gases flowing through the sensor element, to the ECU 5.

The O2 sensor 32 is similar to the O2 sensor 15 appearing in FIG. 1, and has a characteristic that an electromotive force thereof drastically or suddenly changes when the air-fuel ratio of the mixture changes across the stoichiometric value.

Further, an atmospheric pressure (PA) sensor 33 is arranged at a proper location of the engine for supplying the ECU 5 with an electric signal indicative of the atmospheric pressure PA sensed thereby.

The CPU 5b operates in response to the signals from various sensors including those described with respect to the first embodiment to determine operating conditions in which the engine 1 is operating, such as an air-fuel ratio feedback control region and open-loop control regions, and calculates, based upon the determined engine operating conditions, the valve opening period or fuel injection period TOUT over which the fuel injection valves 6 are to be opened by the use of the following equation (13) when the engine is in a basic operating mode, and by the use of the following equation (14) when the engine is in a starting mode, in synchronism with generation of TDC signal pulses, and stores the results of calculation into the memory means 5c (RAM):

$$TOUT = TiM \times KCMDM \times KLAF \times K1 + K2 \quad (13)$$

$$TOUT = TiCR \times K3 + K4 \quad (14)$$

where TiM represents a basic fuel injection period applied when the engine is in the basic operating mode, which, specifically, is determined according to the engine rotational speed NE and the intake pipe absolute pressure PBA. A TiM map used in determining a value of TiM is stored in the memory means 5c (ROM).

TiCR represents a basic fuel injection period applied when the engine is in the starting mode, which is determined according to the engine rotational speed NE and the intake pipe absolute pressure PBA, similarly to TiM. A TiCR map used in determining a value of TiCR is stored in the memory means 5c (ROM), as well.

KCMDM represents a modified desired air-fuel ratio coefficient, which is set based on a desired air-fuel ratio coefficient KCMD determined based on operating conditions of the engine, and an air-fuel ratio correction value ΔKCMD determined based on an output from the O2 sensor 32, as will be described later.

KLAF represents an air-fuel ratio correction coefficient, which is set during the air-fuel ratio feedback control such that the air-fuel ratio detected by the LAF sensor 31 becomes equal to a desired air-fuel ratio set by the KCMDM value, and set during the open-loop control to predetermined values depending on operating conditions of the engine.

K1 and K3 represent correction coefficients and K2 and K4 represent correction variables. The correction coefficients and variables K1 to K4 are set depending on operating conditions of the engine to such values as optimize operating characteristics of the engine, such as fuel consumption and accelerability.

Next, there will be described how the control system according to the present embodiment carries out the air-fuel ratio feedback control by the CPU 5b thereof.

Figure 9:
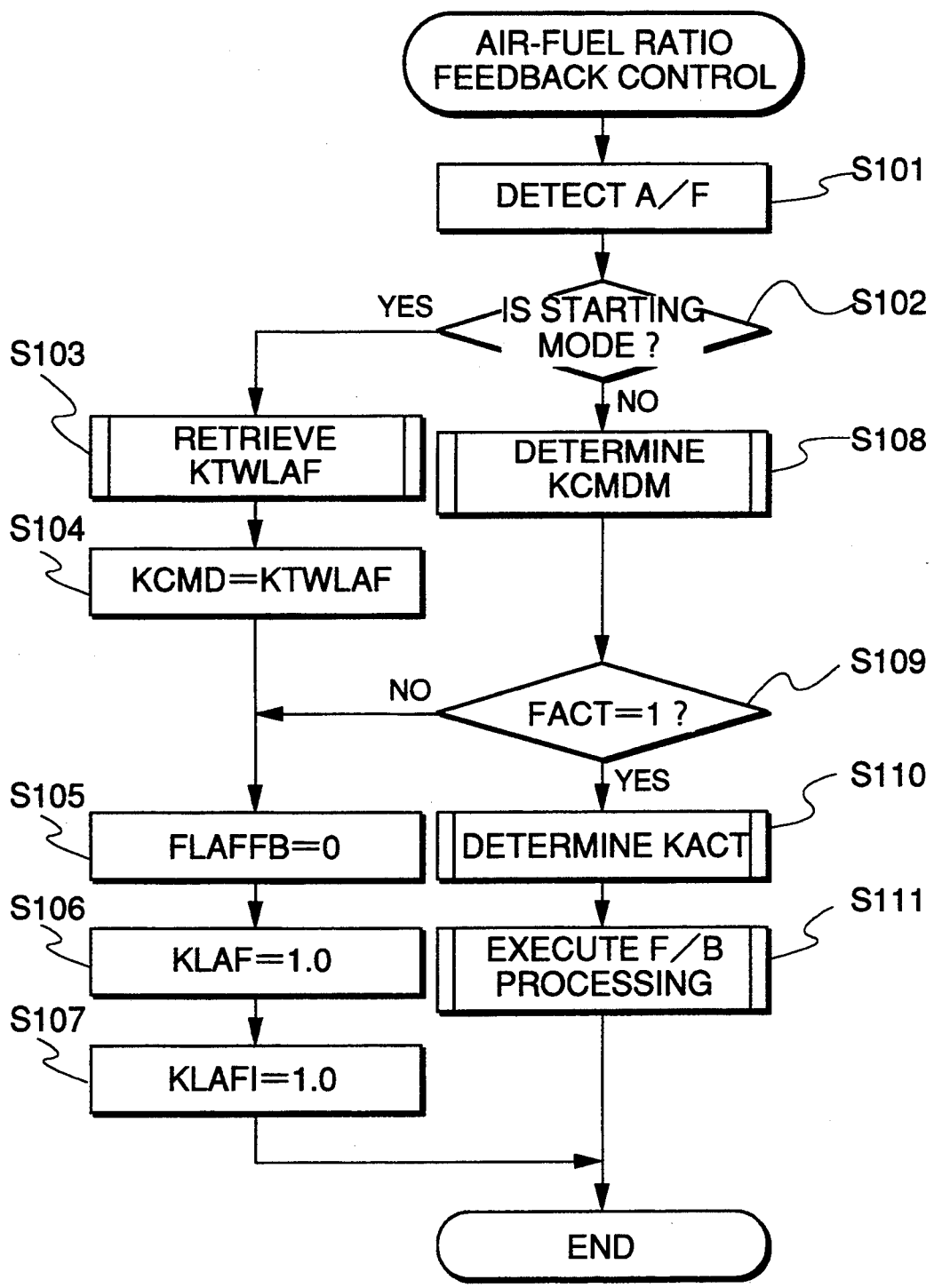
FIG. 9 is a flowchart of a main routine for carrying out the air-fuel ratio feedback control according to the second embodiment.

FIG. 9 shows a main routine for carrying out the air-fuel ratio feedback control.

First, at a step S101, an output value from the LAF sensor 31 is read. Then, at a step S102, it is determined whether or not the engine is in the starting mode. The determination of the starting mode is carried out by determining whether or not a starter switch, not shown, of the engine has been turned on, and at the same time the engine rotational speed NE is below a predetermined value (cranking speed).

If the answer to the question of the step S102 is affirmative (YES), i.e. if the engine is in the starting mode, which implies that the engine temperatures is low, and hence a value of a desired air-fuel ratio coefficient KTWLAF suitable for low engine temperature is determined at a step S103 by retrieving a KTWLAF map according to the engine coolant temperature TW and the intake pipe absolute pressure PBA, and the determined KTWLAF value is set to the desired air-fuel ratio coefficient KCMD at a step S104. Then, a flag FLAFFB is set to "0" at a step S105 to inhibit the air-fuel ratio feedback control, and the air-fuel ratio correction coefficient KLAF and an integral term (I term) thereof KLAFI are both set to 1.0 at respective steps S106 and S107, followed by terminating the program.

On the other hand, if the answer to the question of the step S102 is negative (NO), i.e. if the engine is in the basic operating mode., the modified desired air-fuel ratio coefficient KCMDM is determined at a step S108 by a KCMDM-determining routine described hereinafter with reference to FIG. 10, and then it is determined at a step S109 whether or not a flag FACT is equal to "1" in order to judge whether the LAF sensor 31 has been activated. The determination as to whether the LAF sensor 31 has been activated is carried out by the use of another routine, not shown, which is executed as background processing, in which when the difference between an actual value VOUT of the output voltage from the LAF sensor 31 add a predetermined central voltage value VCENT of same is smaller than a predetermine value (e.g. 0.4 V), for instance, it is determined that the LAF sensor 31 has been activated.

Then, if the answer to the question of the step S109 is negative (NO), the program proceeds to the step S105, whereas if the answer to the question of the step S109 is affirmative (YES), i.e. if the LAF sensor 31 has been activated, the program proceeds to a step S110, where an equivalent ratio KACT (14.7/(A/F)) of the air-fuel ratio detected by the LAF sensor 31 (hereinafter referred to as "the detected air-fuel ratio coefficient") is calculated. The detected air-fuel ratio coefficient KACT is calculated to a value based on the intake pipe absolute pressure PBA, the engine rotational speed NE, and the atmospheric pressure PA by the use of a KACT-calculating routine, not shown, because the pressure of exhaust gases varies with these operating parameters of the engine.

Then, at a step S111, a feedback processing routine is executed, followed by terminating the program. More specifically, if predetermined feedback control conditions are not satisfied, the flag FLAFFB is set to "0" to inhibit the air-fuel ratio feedback control, whereas if the predetermined feedback control conditions are satisfied, the flag FLAFFB is set to "1", and the air-fuel ratio correction coefficient KLAF is calculated, to execute the air-fuel ratio feedback control, followed by terminating the program.

Figure 10:
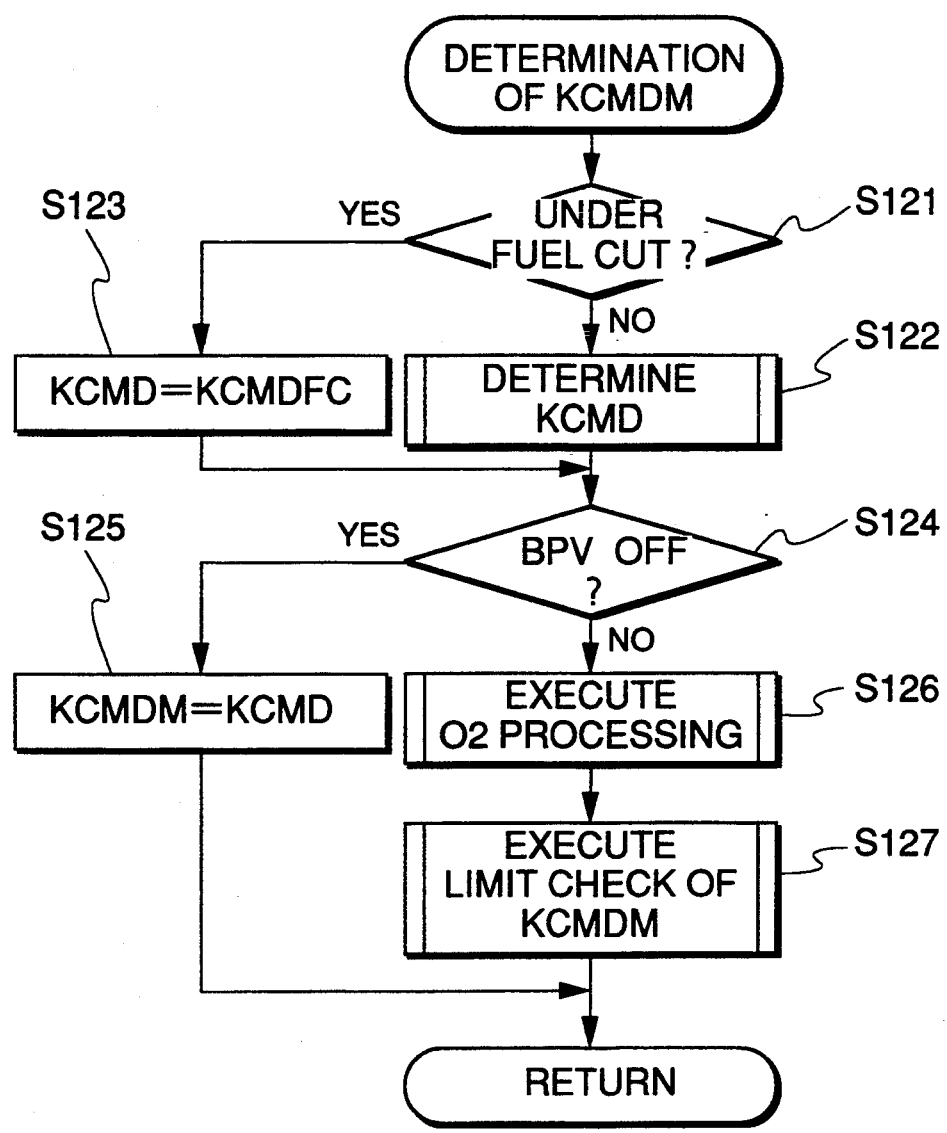
FIG. 10 is a flowchart of a KCMDM-determining routine.

FIG. 10 shows the KCMDM-determining routine executed at the step S108 in FIG. 9, which is executed in synchronism with generation of TDC signal pulses.

First, at a step S121, it is determined whether or not the engine is under fuel cut. The determination as to fuel cut is carried out based on the engine rotational speed NE and the valve opening θ TH of the throttle valve 3', by a fuel cut-determining routine, not shown.

If the answer to the question of the step S121 is negative (NO), i.e. if the engine is not under fuel cut, the program proceeds to a step S122, where the desired air-fuel ratio coefficient KCMD is determined by a KCMD-determining routine, not shown. The desired air-fuel ratio coefficient KCMD is normally read from a KCMD map according to the engine rotational speed NE and the intake pipe absolute pressure PBA, which map is set such that predetermined KCMD map values are set correspondingly to predetermined values of the engine rotational speed NE and those of the intake pipe absolute pressure PBA. When a vehicle on which the engine is installed is started from its standing position, or when the engine is in a cold condition, or in a predetermined high load condition, a map value read from the KCMD map is corrected to a suitable value. Following the KCMD calculation, the program proceeds to a step S124.

On the other hand, if the answer to the question of the step S121 is affirmative (YES), the desired air-fuel ratio coefficient KCMD is set to a predetermined value KCMDFC (e.g. 1.0) at a step S123, and then the program proceeds to the step S124.

At the step S124, it is determined whether or not the BPV 18 is in its BPV OFF position. This determination is carried out based on the output from the BP sensor 20. If the answer to this question is affirmative (YES), i.e. if the BPV 18 is in its BPV OFF position, the desired air-fuel ratio coefficient KCMD determined either at the step S122 or at the step S123 is set, without correction, to the corrected desired air-fuel ratio coefficient KCMDM at a step S125, followed by terminating the subroutine and returning to the FIG. 9 main routine.

On the other hand, if the answer to the question of the step S124 is negative (NO), i.e. if the BPV 18 is in its BPV ON position, the program proceeds to a step S126, where O2 processing is executed. More specifically, the desired air-fuel ratio coefficient KCMD is corrected based on the output from the O2 sensor 32 to obtain the modified desired air-fuel ratio coefficient KCMDM, under predetermined conditions, as will be described hereinafter.

Then, at the following step S127, a limit check of the modified desired air-fuel ratio coefficient KCMDM is carried out, followed by terminating the present subroutine to return to the FIG. 9 main routine. More specifically, the KCMDM value calculated at the step S126 is compared with predetermined upper and lower limit values KCMDMH and KCMDML, and if the KCMDM value is larger than the predetermined upper limit value KCMDMH, the former is corrected to the latter, whereas if the KCMDM value is smaller than the predetermined lower limit value KCMDML, the former is corrected to the latter.

Figure 11:
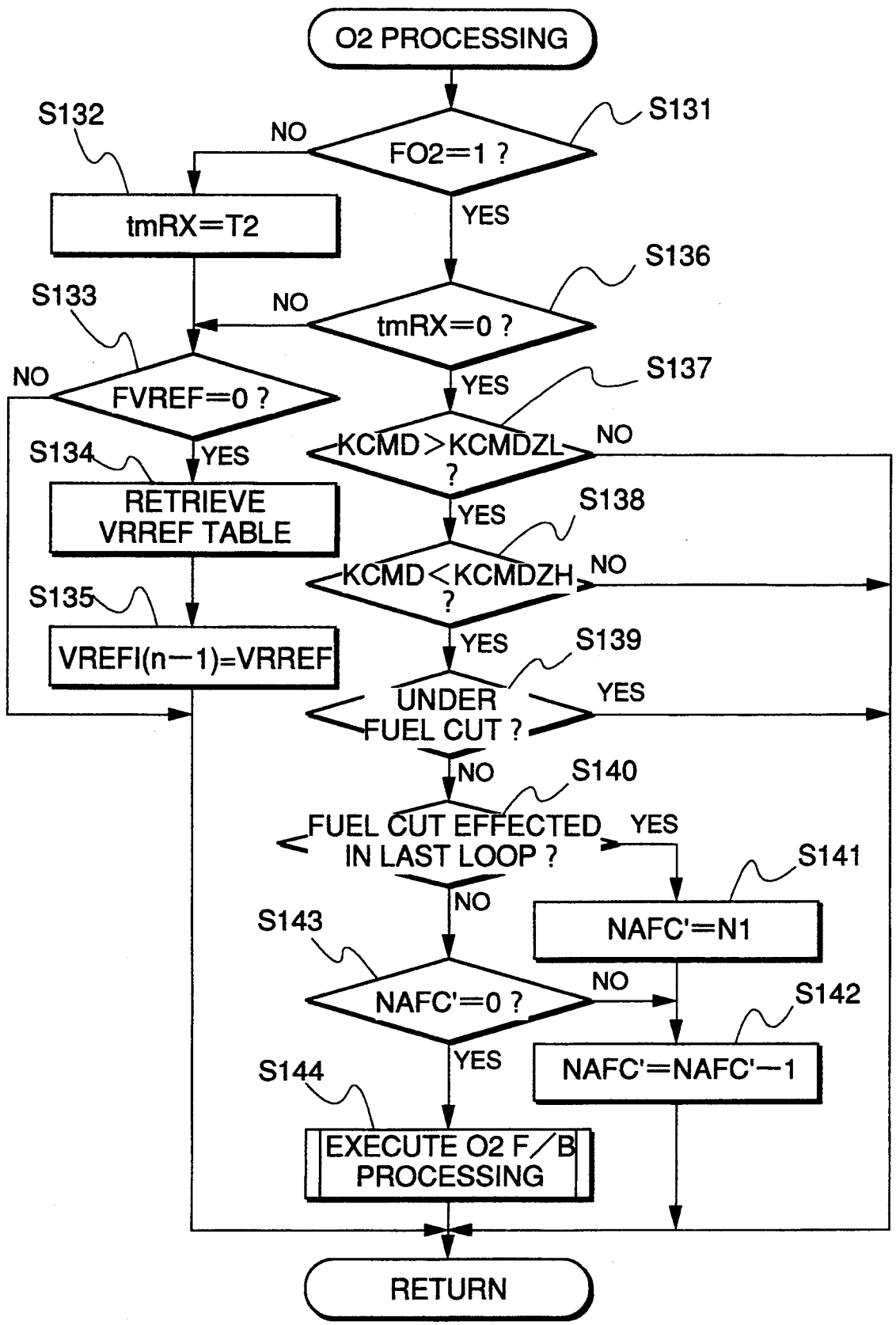
FIG. 11 is a flowchart of an O2 processing routine.

FIG. 11 shows an O2 processing routine, which is executed at the step S126 in FIG. 10, in synchronism with generation of TDC signal pulses.

First, at a step S131, it is determined whether or not a flag FO2 is equal to "1" to determine whether the O2 sensor 32 has been activated. The determination as to activation of the O2 sensor 32 is carried out by an O2 sensor activation-determining routine, not shown.

If the answer to the question of the step S131 is negative (NO), i.e. if it is determined that the O2 sensor 32 has not been activated, the program proceeds to a step S132, where a timer tmRX is set to a predetermined value T2 (e.g. 0.25 sec.), and then it is determined at a step S133 whether or not a flag FVREF is equal to "0" to thereby determine whether or not a desired value VREF of output voltage VO2 from the O2 sensor 32 has been set to an initial value thereof (hereinafter referred to as "the initial desired value") VRREF.

In the first loop of execution of the present routine, normally, the answer to the question of the step S133 is affirmative (YES) (FVREF=0), the program proceeds to a step S134, where a VRREF table, not shown, stored in the memory means 5c (ROM) is retrieved to determine the initial desired value VRREF.

Then, at a step S135, an integral term (I term) VREFI(n−1) of the desired value VREF in the immediately preceding loop is set to the initial desired value VRREF, and then this subroutine is terminated, followed by the program returning to the FIG. 9 main routine. In the following loops, the answer to the question of the step S133 is negative (NO), since the desired value VREF has already been set to the initial desired value VRREF as described above, so that the present routine is immediately terminated without executing the steps S134 and S135.

Further, if the answer to the question of the step S131 is affirmative (YES), it is determined that the O2 sensor 32 has been activated, and then the program proceeds to a step S136, where it is determined whether or not the count value of the timer tmRX is equal to "0". If the answer to this question is negative (NO), the program proceeds to the step S133, whereas if the answer is affirmative (YES), it is determined that the activation of the O2 sensor 32 has been completed, and then the program proceeds to a step S137, where it is determined whether or not the desired air-fuel ratio coefficient KCMD set at the step S122 or S123 in the FIG. 10 routine is larger than a predetermined lower limit value KCMDZL (e.g. 0.98).

If the answer to this question is negative (NO), it means that the air-fuel ratio of the mixture has been controlled to a value suitable for a so-called lean-burn state, and then the present routine is immediately terminated, whereas if the answer is affirmative (YES), the program proceeds to a step S138, where it is determined whether or not the desired air-fuel ratio coefficient KCMD is smaller than a predetermined upper limit value KCMDZH (e.g. 1.13). If the answer to this question is negative (NO), it means that the air-fuel ratio of the mixture has been controlled to a rich value, and then the present routine is immediately terminated, whereas if the answer is affirmative (YES), it is determined that the air-fuel ratio of the mixture is to be controlled to the stoichiometric value (A/F=14.7), so that the program proceeds to a step S139, where it is determined whether or not the engine is under fuel cut. If the answer to this question is affirmative (YES), the present routine is immediately terminated to return to the FIG. 10 routine, whereas if the answer is negative (NO), it is determined at a step S140 whether or not the engine was under fuel cut in the immediately preceding loop. If the answer to this question is affirmative (YES), a count value NAFC' of a counter NAFC is set to a predetermined value N1 (e.g. 4) at a step S141, and the count value NAFC' is decreased by a decremental value of "1" at a step S142, followed by terminating the present routine.

On the other hand, if the answer to the question of the step S140 is negative (NO), the program proceeds to a step S143, where is determined whether or not the count value NAFC' of the counter NAFC is equal to "0". If the answer to this question is negative (NO), the program proceeds to the step S142, whereas if the answer is affirmative (YES), it is determined that the fuel supply has been stabilized after termination of fuel cut, and the program proceeds to a step S144, where the O2 feedback processing is executed, followed by terminating the present routine to return to the FIG. 10 routine.

Figure 12:
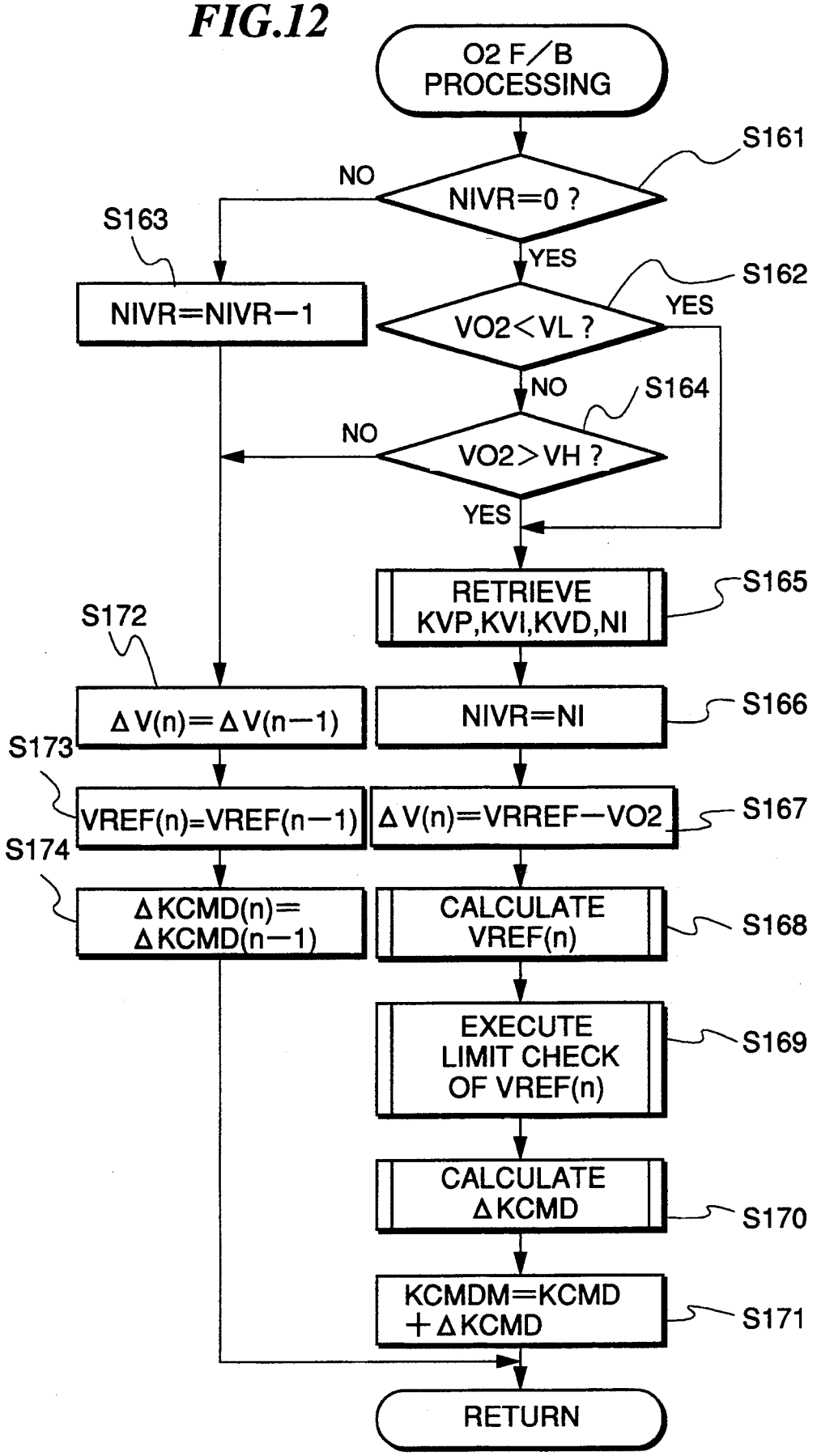
FIG. 12 is a flowchart of an O2 feedback control routine.

FIG. 12 shows an O2 feedback processing routine which is executed at the step S144 of the FIG. 11 routine, in synchronism with generation of TDC signal pulses.

First, at a step S161, it is determined whether or not a thinning-out variable NIVR is equal to "0". The thinning-out variable NIVR is reduced to 0 whenever a number of TDC signal pulses are generated, which corresponds to a thinning-out number NI, which is set depending on operating conditions of the engine as will be described later. The answer to the question of the step S161 in the first loop of execution of the present routine is affirmative (YES), since the variable NIVR has not been set to the number NI, so that the program proceeds to a step S162.

Further, if the answer to the question of the step S161 becomes negative in subsequent loops, the program proceeds to a step S163, where a decremental value of 1 is subtracted from the thinning-out variable NIVR, followed by the program proceeding to a step S172, referred to hereinafter.

At the step S162, it is determined whether or not the output voltage VO2 from the O2 sensor 32 is lower than a predetermined lower limit value VL (e.g. 0.3 V). If the answer to this question is affirmative (YES), it is judged that the air-fuel ratio of the mixture is deviated from the stoichiometric value to a leaner value, so that the program proceeds to a step S165, whereas if the answer is negative (NO), the program proceeds to a step S164, where it is determined whether or not the output voltage VO2 from the O2 sensor 32 is higher than a predetermined upper limit value (e.g. 0.8). If the answer to this question is affirmative (YES), it is determined that the air-fuel ratio of the mixture is deviated from the stoichiometric value to a richer value, so that the program proceeds to the step S165.

At the step S165, a KVP map, a KVI map, a KVD map, and an NI map, none of which are shown, are retrieved to determine control parameters indicative of a rate of change in the O2 feedback control amount, i.e. a proportional term (P term) coefficient KVP, an integral term (I term) coefficient KVI, and a differential term (D term) coefficient KVD, and the aforementioned thinning-out number NI.

Then, at a step S166, the thinning-out variable NIVR is set to the value or number NI determined at the step S165, and then the program proceeds to a step S167 where there is calculated a difference $\Delta V(n)$ between the initial desired value VRREF determined at the step S134 of the FIG. 11 routine and the output voltage VO2 from the O2 sensor 32 detected in the present loop.

Then, at a step S168, desired values VREFP(n), VREFI(n), and VREFD(n) of the respective correction terms, i.e. P term, I term, and D term, are calculated by the use of the following equations (15) to (17):

$$VREFP(n) = \Delta V(n) \times KVP \quad (15)$$

$$VREFI(n) = VREF + \Delta V(n) \times KVI \quad (16)$$

$$VREFD(n) = (\Delta V(n) - \Delta V(n-1)) \times KVD \quad (17)$$

Then, these calculated desired values are added together by the use of the following equation (18), to determine the desired value VREF(n) of the output voltage VO2 from the O2 sensor 32 used in the O2 feedback control:

$$VREF(n) = VREFP(n) + VREFI(n) + VREFD(n) \quad (18)$$

Then, at a step S169, a limit check of the desired value VREF(n) determined at the step S168 is carried out. After the limit check of the desired value VREF(n) is executed, the program proceeds to a step S170, where an air-fuel ratio correction value $\Delta KCMD$ is determined by retrieving a $\Delta KCMD$ table, not shown.

Then, at a step S171, the air-fuel ratio correction value $\Delta KCMD$ is added to the desired air-fuel ratio correction coefficient KCMD determined at the step S122 in FIG. 10 to calculate the modified desired air-fuel ratio coefficient KCMDM (equivalent to the stoichiometric air-fuel ratio in the present embodiment), followed by terminating this routine.

On the other hand, if the answer to the question of the step S164 is negative (NO), i.e. if the output voltage VO2 from the O2 sensor 32 is equal to or higher than the predetermined lower limit value VL but equal to or lower than the predetermined higher limit value VH, i.e. if VL $\leq$ VO2 $\leq$ VH, the O2 feedback control is inhibited, and hence the program proceeds to steps S172 to S174, where the aforementioned difference $\Delta V$ (between VRREF and VO2), the desired value VREF, and the air-fuel ratio correction value $\Delta KCMD$ are held at the respective values assumed in the immediately preceding loop, followed by terminating the program. This prevents the O2 feedback control from being unnecessarily carried out when the air-fuel ratio of the mixture is determined to remain substantially equal to the stoichiometric value, to thereby attain excellent controllability, that is, to stabilize the air-fuel ratio of the mixture.

As described above, according to the second embodiment, in the KCMDM-calculating routine of FIG. 10, the correction of the desired air-fuel ratio coefficient KCMD is permitted or inhibited, depending on the position of the BPV 18 (the BPV ON position or the BPV OFF position), which makes it possible to control the air-fuel ratio of the mixture to a desired air-fuel ratio by the feedback control by the FIG. 9 main routine, thereby improving exhaust emission characteristics.

What is claimed is:

1. A control system for controlling operation of an internal combustion engine including an exhaust passage, a first catalytic converter arranged in said exhaust passage, a second catalytic converter arranged in said exhaust passage at a location downstream of said first catalytic converter, a bypass passage bypassing said first catalytic converter, and exhaust mode-changeover means for performing changeover of an exhaust mode between a first exhaust mode in which exhaust gases are guided through said first catalytic converter and a second exhaust mode in which exhaust gases are guided through said bypass passage, the control system comprising:

exhaust mode-detecting means for detecting which of said first and second exhaust modes is selected by said exhaust mode-changeover means; and control mode-changeover means responsive to an output from said exhaust mode-detecting means for determining a control mode in which the operation of the engine is to be controlled by said control system.

2. A control system for controlling operation of an internal combustion engine including an exhaust passage, a first catalytic converter arranged in said exhaust passage, a second catalytic converter arranged in said exhaust passage at a location downstream of said first catalytic converter, a bypass passage bypassing said first catalytic converter, and exhaust mode-changeover means for performing changeover of an exhaust mode between a first exhaust mode in which exhaust gases are guided through said first catalytic converter and a second exhaust mode in which exhaust gases are guided through said bypass passage, the control system comprising:

exhaust mode-detecting means for detecting which of said first and second exhaust modes is selected by said exhaust mode-changeover means;

control mode-changeover means responsive to an output from said exhaust mode-detecting means for determining a control mode in which the operation of the engine is to be controlled by said control system; and control amount-calculating means for calculating at least one of a control amount for control of an amount of fuel supplied to said engine and a control amount for control of ignition timing of said engine, and wherein said control mode-changeover means is responsive to the output from said exhaust mode-detecting means for performing changeover of said at least one of said control amount for said amount of fuel supplied to said engine and said control amount for said ignition timing, between a value suitable for said first exhaust mode and a value suitable for said second exhaust mode.

3. A control system according to claim 2, including operating condition-detecting means for detecting operating conditions of said engine including the rotational speed of said engine and load on said engine, and wherein said control amount-calculating means includes basic control amount-calculating means for calculating at least one of a basic control amount for control of said amount of fuel supplied to said engine and a basic control amount for control of said ignition timing of said engine, said control mode-changeover means performing changeover of at least one of said basic control amounts between a first basic control amount suitable for said first exhaust mode and a second basic control amount suitable for said second exhaust mode.

4. A control system according to claim 3, wherein said engine includes at least one cylinder, an intake valve provided for each of said at least one cylinder for controlling the supply of an air-fuel mixture to the each cylinder, an exhaust valve provided for the each cylinder for controlling the delivery of exhaust gases from the each cylinder, valve timing-changeover means for performing changeover of valve timing of at least one of said intake valve and said exhaust valve between a high speed valve timing suitable for operation of said engine in a high rotational speed region, and a low speed valve timing suitable for operation of said engine in a low rotational speed region, and valve timing-detecting means for detecting valve timing selected by said valve timing-changeover means, said control mode-changeover means being responsive to an output from said valve timing-detecting means, for employing a control amount value suitable for said high speed valve timing or a control amount value suitable for said low speed valve timing, as said first basic control amount or said second basic control amount.

5. A control system according to claim 3 or 4, wherein said engine includes an intake passage, and at least one fuel injection valve for injecting fuel into said intake passage, said control amount-calculating means including direct supply amount-determining means for determining a direct supply amount of fuel directly supplied to said engine out of fuel injected by said at least one fuel injection valve, indirect supply amount-determining means for determining an indirect supply amount of fuel supplied to said engine out of fuel adhering to said intake passage, and correcting means for correcting a control amount for control of an amount of fuel supplied to said engine, based on at least one of the direct supply amount of fuel determined by said direct supply amount-determining means and the indirect supply amount of fuel determined by said indirect supply amount-determining means.

6. A control system according to claim 5, wherein said control mode-changeover means is responsive to the output from said exhaust mode-detecting means, for performing changeover of each of said direct supply amount of fuel and said indirect supply amount of fuel between a value suitable for said first exhaust mode and a value suitable for said second exhaust mode.

7. A control system for controlling operation of an internal combustion engine including an exhaust passage, a first catalytic converter arranged in said exhaust passage, a second catalytic converter arranged in said exhaust passage at a location downstream of said first catalytic converter, a bypass passage bypassing said first catalytic converter, and exhaust mode-changeover means for performing changeover of an exhaust mode between a first exhaust mode in which exhaust gases are guided through said first catalytic converter and a second exhaust mode in which exhaust gases are guided through said bypass passage, the control system comprising:

exhaust mode-detecting means for detecting which of said first and second exhaust modes is selected by said exhaust mode-changeover means;

control mode-changeover means responsive to an output from said exhaust mode-detecting means for determining a control mode in which the operation of the engine is to be controlled by said control system;

first exhaust gas ingredient concentration sensor means arranged in said exhaust passage at a location upstream of said exhaust mode-changing means and having an output characteristic substantially proportional to the concentration of a specific ingredient in said exhaust gases;

engine operating condition-detecting means for detecting operating conditions of said engine;

desired air-fuel ratio control parameter-calculating means for calculating a control parameter of a desired air-fuel ratio of an air-fuel mixture supplied to said engine, based on results of detection by said engine operating condition-detecting means;

second exhaust gas ingredient concentration sensor means arranged in said exhaust passage at a location downstream of said bypass passage and upstream of said second catalytic converter and having an output characteristic that an output therefrom drastically changes in the vicinity of a stoichiometric air-fuel ratio of said air-fuel mixture supplied to said engine;

correcting means for correcting said control parameter of said desired air-fuel ratio based on the output from said second exhaust gas ingredient concentration sensor means;

control means for feedback-controlling the air-fuel ratio of said mixture detected based on an output from said first exhaust gas ingredient concentration sensor means to said stoichiometric air-fuel ratio, based on said control parameter of said desired air-fuel ratio coefficient corrected by said correcting means; and inhibiting means responsive to the output from said exhaust mode-detecting means for inhibiting said correcting means from correcting said control parameter of said desired air-fuel ratio when said second exhaust mode is selected.

* * * * *